United States Patent
Park et al.

(10) Patent No.: US 10,528,006 B2
(45) Date of Patent: Jan. 7, 2020

(54) WEARABLE ELECTRONIC DEVICE INCLUDING BAND

(71) Applicant: SAMSUNG ELECTRONICS CO., LTD., Suwon-si, Gyeonggi-do (KR)

(72) Inventors: Sung-Eun Park, Hwaseong-si (KR); Jeong-Eun Kim, Suwon-si (KR); Chang-Seok Bae, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/139,362

(22) Filed: Sep. 24, 2018

(65) Prior Publication Data

US 2019/0094809 A1 Mar. 28, 2019

(30) Foreign Application Priority Data

Sep. 28, 2017 (KR) .......................... 10-2017-0126520

(51) Int. Cl.
  *G04B 37/08* (2006.01)
  *G04B 37/14* (2006.01)
  (Continued)

(52) U.S. Cl.
  CPC .............. *G04B 37/081* (2013.01); *A44C 5/14* (2013.01); *A44C 5/147* (2013.01);
  (Continued)

(58) Field of Classification Search
  CPC .............. G04B 37/081; G04B 37/1486; G04B 37/1493; A44C 5/14; A44C 5/147;
  (Continued)

(56) References Cited

U.S. PATENT DOCUMENTS

| 4,194,355 A * | 3/1980 | Nishida .............. G04B 37/1486 368/204 |
| 6,014,793 A | 1/2000 | Howald |

(Continued)

FOREIGN PATENT DOCUMENTS

KR 10-2014-0033961 3/2014

*Primary Examiner* — Binh B Tran
*Assistant Examiner* — Douglas R Burtner
(74) *Attorney, Agent, or Firm* — Nixon & Vanderhye P.C.

(57) ABSTRACT

A wearable electronic device may include: a housing including a front plate, a rear plate, and a side member surrounding an inner space between the front plate and the rear plate, wherein the side member includes at least one portion including an external opening and an inner channel connecting between the inner space and the external opening: an insulating structure inserted into the inner channel; a conductive path partially embedded in the insulating structure, wherein the conductive path includes a first end exposed to the inner space and a second end exposed to the external opening; at least one printed circuit board positioned in the inner space and electrically connected to the first end of the conductive path; a display exposed through the front plate; and a band structure connected to the portion of the housing and configured to be mounted on a portion of a human body. The band structure may include a conductive rod movably inserted into the external opening and electrically connected to the second end of the conductive path, and an electronic component at least partially embedded in the band structure and electrically connected to the conductive rod. Other various embodiments may also exist.

6 Claims, 31 Drawing Sheets

(51) Int. Cl.
  *G04G 17/08* (2006.01)
  *G06F 1/16* (2006.01)
  *G04G 17/06* (2006.01)
  *A44C 5/14* (2006.01)
  *G04G 21/02* (2010.01)
  *G04G 21/04* (2013.01)

(52) U.S. Cl.
  CPC ..... *G04B 37/1486* (2013.01); *G04B 37/1493* (2013.01); *G04G 17/06* (2013.01); *G04G 17/08* (2013.01); *G04G 21/025* (2013.01); *G04G 21/04* (2013.01); *G06F 1/163* (2013.01)

(58) Field of Classification Search
  CPC ...... G04G 17/06; G04G 17/08; G04G 21/025; G04G 21/04; G06F 1/163
  See application file for complete search history.

(56) References Cited

U.S. PATENT DOCUMENTS

| | | | | |
|---|---|---|---|---|
| 6,748,631 B2* | 6/2004 | Iguchi | ........... | A44C 5/0007 16/277 |
| 9,141,086 B1* | 9/2015 | Rohrbach | ........... | G04B 37/1486 |
| 2004/0084200 A1* | 5/2004 | Noirjean | ........... | A44C 5/14 174/50 |
| 2015/0342525 A1* | 12/2015 | Justice | ........... | A61B 5/6831 600/479 |
| 2015/0378321 A1* | 12/2015 | Fraser | ........... | G04G 21/04 368/10 |
| 2016/0037870 A1* | 2/2016 | Perkins | ........... | A44B 17/0011 24/664 |
| 2016/0070393 A1* | 3/2016 | Sharma | ........... | G06F 1/163 345/174 |
| 2016/0223992 A1* | 8/2016 | Seo | ........... | G04G 19/10 |
| 2016/0278203 A1* | 9/2016 | Nakayama | ........... | G06F 1/163 |
| 2016/0363957 A1* | 12/2016 | Stroetmann | ........... | G06F 1/163 |
| 2017/0045910 A1* | 2/2017 | Lee | ........... | G04B 37/1486 |
| 2017/0168458 A1* | 6/2017 | Nicolas | ........... | A44C 5/14 |
| 2017/0250554 A1* | 8/2017 | Tajima | ........... | A44C 5/0053 |
| 2017/0277138 A1* | 9/2017 | Kaji | ........... | A61B 5/11 |
| 2017/0315584 A1* | 11/2017 | Lee | ........... | G06F 1/163 |
| 2018/0013947 A1* | 1/2018 | Kim | ........... | G06F 13/14 |
| 2018/0107168 A1* | 4/2018 | Han | ........... | G04G 17/02 |
| 2018/0188772 A1* | 7/2018 | Lee | ........... | A44C 5/14 |
| 2018/0220923 A1* | 8/2018 | Shim | ........... | G06F 1/163 |
| 2019/0041917 A1* | 2/2019 | Chung | ........... | G04B 37/08 |
| 2019/0069646 A1* | 3/2019 | Voumard | ........... | G04B 37/0008 |

* cited by examiner

WEARABLE ELECTRONIC DEVICE INCLUDING BAND

CROSS-REFERENCE TO RELATED APPLICATION

This application is based on and claims priority under 35 U.S.C. § 119 to Korean Patent Application No. 10-2017-0126520, filed on Sep. 28, 2017 in the Korean Intellectual Property Office, the disclosure of which is incorporated by reference herein in its entirety.

BACKGROUND

1. Field

Various embodiments relate to an electronic device and, more particularly, to an electronic device including a band.

2. Description of Related Art

The term "electronic device" may include, for example, an electronic scheduler, a portable multimedia reproducer, a mobile communication terminal, a tablet PC, an image/sound device, a desktop/laptop PC, or a vehicular navigation system, as well as a home appliance. For example, electronic devices may output information stored therein as sounds or images. As the degree of integration of the electronic devices has increased, and super-high speed and large-capacity wireless communication have become widely used, various functions may be provided in a single electronic device.

Portable electronic devices may have various forms that can be worn on a human body, such as accessories (e.g., a watch, a band, a necklace, or glasses) or clothing. For example, electronic devices that can be worn on a human body may be referred to as wearable electronic devices. The wearable electronic devices may include a wearable portion to be worn on a human body.

SUMMARY

According to an aspect of the disclosure, there is provided a wearable electronic device, which is miniaturized so as to be worn on a human body, may lack space in a housing for mounting an electronic component such as a battery therein. In order to solve the shortage of space in the housing of the wearable electronic device, the electronic component may be mounted inside a wearable unit. When the electronic component is mounted on inside the wearable unit, a unit electrically connecting the housing and the electronic component is exposed to the outside, or foreign matter (e.g., water) may be introduced to the inside of the housing or the wearable unit. There is a possibility that the electronic component may malfunction, may corrode, or a user may experience an electric shock accident.

According to an aspect of the disclosure, it is possible to provide a wearable electronic device that prevents foreign matter such as water from entering the inside of the housing.

A wearable electronic device, according to an aspect of the disclosure, may include: a housing including a front plate, a rear plate, and a side member surrounding an inner space between the front plate and the rear plate, wherein the side member includes at least one portion including an external opening and an inner channel connecting between the inner space and the external opening; an insulating structure inserted into the inner channel; a conductive path partially embedded in the insulating structure, wherein the a conductive path includes a first end exposed to the inner space and a second end exposed to the external opening; at least one printed circuit board located in the inner space and electrically connected to the first end of the conductive path; a display exposed through the front plate; and a band structure connected to the portion of the housing and configured to be mounted on a portion of a human body. The band structure may include a conductive rod movably inserted into the external opening and electrically connected to the second end of the conductive path, as well as an electronic component at least partially embedded in the band structure and electrically connected to the conductive rod.

A band structure, included in a wearable electronic device according to an aspect of the disclosure, may include: a body portion in which a second opening is disposed; a conductive rod configured to be movable through the second opening and coupling the wearable electronic device and the body portion; and a second sealing member configured to seal a gap between the second opening and the conductive rod.

A wearable electronic device according to an aspect of the disclosure may include: a housing having an external opening formed therein; an insulating structure inserted into the external opening; a first sealing member configured to seal a gap between the external opening and the insulating structure; a band structure having a second opening formed therein and mounted on a portion of a human body; a conductive rod configured to be movable through the second opening and to detachably couple the housing and the band structure; a second sealing member configured to seal a gap between the second opening and the conductive rod; and a third sealing member disposed adjacent to an end of the conductive rod and configured to seal a gap between the external opening and the conductive rod when the housing and the band structure are coupled.

A wearable electronic device, according to an aspect of the disclosure, includes an insulating structure inserted in an inner channel that waterproofs an inner channel, so that foreign matter such as water can be prevented from entering the interior of the housing.

A band structure included in the wearable electronic device, according to an aspect of the disclosure, includes a sealing member, so that foreign matter such as water can be prevented from entering the inside of the body portion.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
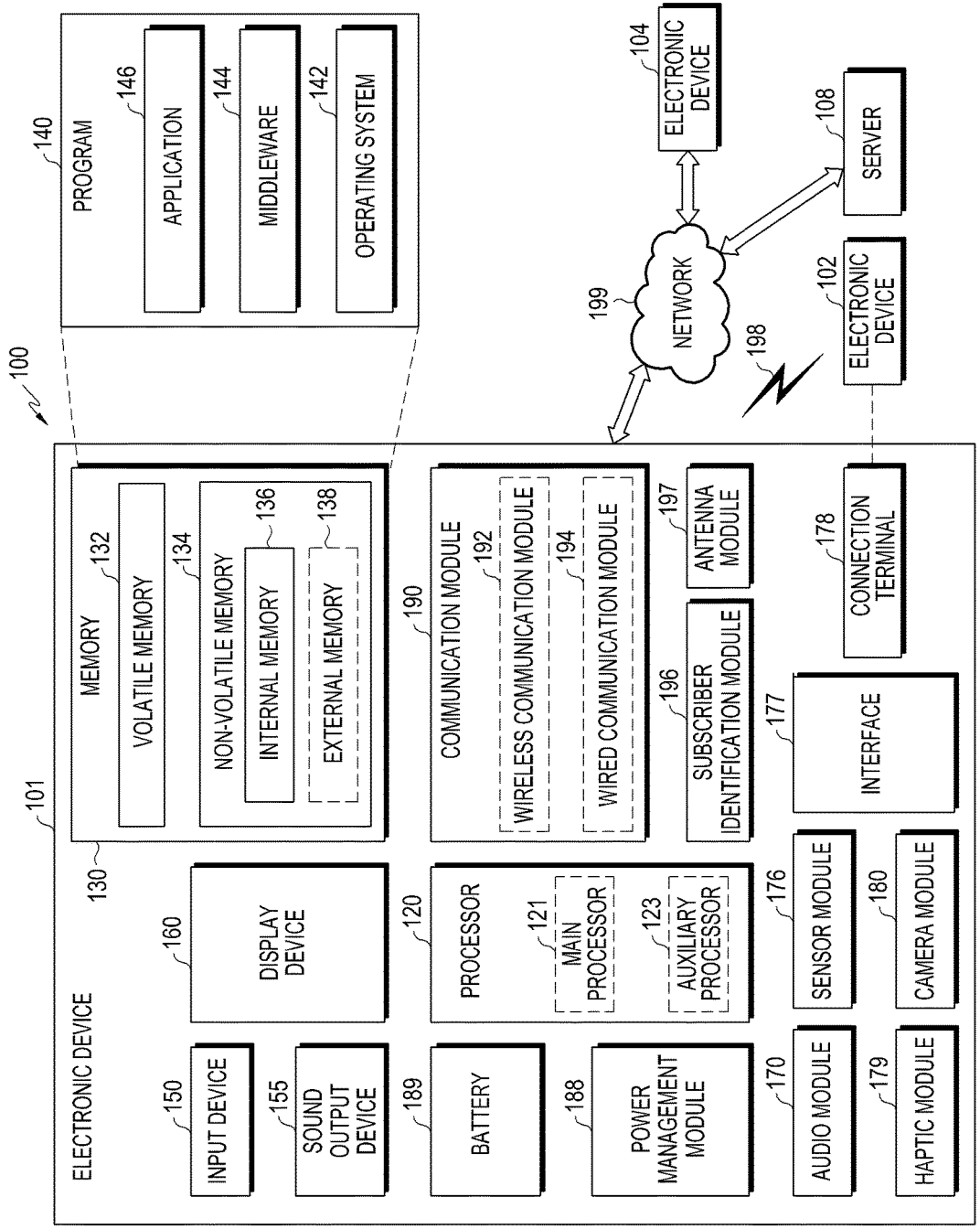
FIG. 1 is a block diagram illustrating an electronic device within a network environment, according to various embodiments.

An electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. The electronic device according to embodiments is not limited to the above-described devices.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B", "one or more of A and/or B", "A, B, or C", or "one or more of A, B and/or C" may include all possible combinations of them. The expression "a first", "a second", "the first", or "the second" used in various embodiments may use various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments disclosed herein may be implemented by software (e.g., program 140) including an instruction stored in machine-readable storage media (e.g., internal memory 136 or external memory 138). The machine is a device that calls the stored instruction from the storage media and can operate according to the called instruction, and may include an electronic device (e.g., electronic device 101) according to the disclosed embodiments. The instruction, when executed by a processor (e.g., processor 120), may cause the processor to directly execute a function corresponding to the instruction or cause other elements to execute the function under the control of the processor. The instruction may include a code that is made by a compiler or executable by an interpreter. The machine-readable storage media may be provided in the form of non-transitory storage media. Here, the term "non-transitory" only means that the storage media is tangible without including a signal, irrespective of whether data is semi-permanently or transitorily stored in the storage media.

The method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

FIG. 1 is a block diagram illustrating an electronic device 101 in a network environment 100, according to various embodiments. Referring to FIG. 1, the electronic device 101 in the network environment 100 may communicate with an electronic device 102 via a first network 198 (e.g., short-range wireless communication), or may communicate with an electronic device 104 or a server 108 via a second network 199 (e.g., long-range wireless communication). According to an example embodiment, the electronic device 101 may communicate with the electronic device 104 via the server 108. According to an example embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, at least one of these components (e.g., the display device 160 or the camera module 180) may be omitted from the electronic device 101 or other components may be added to the electronic device 101. In some embodiments, some components may be implemented in an integrated form as in the case of the sensor module 176 (e.g., a fingerprint sensor, an iris sensor, or an illuminance sensor), which is embedded in, for example, the display device 160 (e.g., a display).

The processor 120 may control one or more other components (e.g., a hardware or software component) of the electronic device 101, which are connected to the processor 120, and may perform various data processing and arithmetic operations by driving, for example, software (e.g., a program 140). The processor 120 may load commands or data, which are received from other components (e.g., the sensor module 176 or the communication module 190), into a volatile memory 132 so as to process the commands or data, and may store resulting data into a non-volatile memory 134. According to an example embodiment, the processor 120 may include a main processor 121 (e.g., a central processing unit or an application processor), and an auxiliary processor 123, which operates independently from the main processor 121, additionally or alternatively uses a less power than the main processor 121, or includes an auxiliary processor 123 specialized for a designated function (e.g., a graphic processor device, an image signal processor, a sensor hub processor, or a communication processor). Here, the auxiliary processor 123 may be operated separately from the main processor 121 or in the manner of being embedded with the main processor 121.

In this case, the auxiliary processor 123 may control at least some functions or states associated with at least one of the components of the electronic device 101 (e.g., the display device 160, the sensor module 176, or the communication module 190), on behalf of the main processor 121, for example, while the main processor 121 is in an inactive (e.g., sleep) state, or together with the main processor 121 while the main processor 121 is in an active (e.g., application execution) state. According to an example embodiment, the auxiliary processor 123 (e.g., an image signal processor or a communication processor) may be implemented as some of other functionally related components (e.g., camera module 180 or communication module 190). The memory 130 may store various data used by at least one component (e.g., the processor 120 or the sensor module 176) of electronic device 101, for example, software (e.g., the program 140) and input or output data for commands which are associated with the software. The memory 130 may include, for example, a volatile memory 132 or a non-volatile memory 134.

The program 140 may be software stored in the memory 130 and may include, for example, an operating system 142, middleware 144, or application 146.

The input device 150 is a device from the outside (e.g., user) for receiving commands or data to be used in a component (e.g., the processor 120) of the electronic device 101, and may include, for example, a microphone, a mouse, or a keyboard.

The sound output device 155 is a device for outputting a sound signal to the outside of the electronic device 101. The output device 155 may include, for example, a speaker for general use such as multimedia reproduction or sound reproduction and a receiver used only for telephone reception. According to an example embodiment, the receiver may be formed integrally with or separately from the speaker.

The display device 160 is a device for visually providing information to a user of the electronic device 101 and may include, for example, a display, a hologram device, or a projector and a control circuit for controlling the corresponding device. According to an example embodiment, the display device 160 may include a touch circuit or a pressure sensor capable of measuring the intensity of the pressure on the touch.

The audio module 170 may bidirectionally convert sound and electrical signals. According to an example embodiment, the audio module 170 may acquire sound through the input device 150 or may output sound through the sound output device 155 or an external electronic device (e.g., the electronic device 102 (e.g., a speaker or headphone)) connected with the electronic device 101 in a wireless or wired manner.

The sensor module 176 may generate an electrical signal or a data value corresponding to an internal operating state (e.g., power or temperature) of the electronic device 101 or an external environmental condition. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support a designated protocol that may be connected to an external electronic device (e.g., the electronic device 102) in a wired or wireless manner. According to an example embodiment, the interface 177 may include a High Definition Multimedia Interface (HDMI), a Universal Serial Bus (USB) interface, an SD card interface, or an audio interface.

The connection terminal 178 may be a connector capable of physically interconnecting the electronic device 101 and an external electronic device (e.g., the electronic device 102), such as an HDMI connector, a USB connector, an SD card connector, or an audio connector (e.g., a headphone connector).

The haptic module 179 may convert an electrical signal into a mechanical stimulus (e.g., vibration or motion) or an electrical stimulus that the user can perceive through a tactile or kinesthetic sense. The haptic module 179 may include, for example, a motor, a piezoelectric element, or an electrical stimulation device.

The camera module 180 is a device that is capable of capturing, for example, a still image and a video image. According to an example embodiment, the camera module 180 may include one or more lenses, an image sensor, an image signal processor, or a flash.

The power management module 188 is a module for managing power supplied to the electronic device 101, and may be configured as at least a part of, for example, a Power Management Integrated Circuit (PMIC).

The battery 189 is a device for supplying power to at least one component of the electronic device 101 and may include, for example, a non-rechargeable primary battery, a rechargeable secondary battery, or a fuel cell.

The communication module 190 may establish a wired or wireless communication channel between the electronic device 101 and an external electronic device (e.g., the electronic device 102, the electronic device 104, or the server 108) and may support communication via the established communication channel. The communication module 190 may include a processor 120 (e.g., an application processor) and one or more communication processors, which are independently operated and support wired communication or wireless communication. According to an example embodiment, the communication module 190 may include a wireless communication module 192 (e.g., a cellular communication module, a short range wireless communication module, or a Global Navigation Satellite System (GNSS) communication module) or a wired communication module 194 (e.g., a Local Area Network (LAN) communication module or a power line communication module), and may communicate with an external electronic device via a first network 198 (e.g., a short-range communication network, such as Bluetooth, WiFi direct, or Infrared Data Association (IrDA)) or a second network 199 (e.g., a long-range communication network such as a cellular network, the Internet, or a computer network (e.g., a LAN or a WAN)), using a corresponding communication module among the above-mentioned communication modules. Various types of communication modules 190 described above may be implemented as a single chip or may be implemented as separate chips, respectively.

According to an example embodiment, the wireless communication module 192 may identify and authenticate the electronic device 101 within the communication network using the user information stored in the subscriber identification module 196.

The antenna module 197 may include one or more antennas configured to transmit/receive signals or power to/from the outside. According to an example embodiment, the communication module 190 (e.g., the wireless communication module 192) may transmit/receive signals to/from an external electronic device via an antenna suitable for the communication scheme thereof.

Among the components described above, some components may be connected to each other via a communication scheme (e.g., a bus, a General-Purpose Input/Output (GPIO), a Serial Peripheral Interface (SPI), or a Mobile Industry Processor Interface (MIPI)) and may exchange signals (e.g., commands or data) therebetween.

According to an example embodiment, the commands or data may be transmitted or received between the electronic device 101 and the external electronic device 104 via the server 108 connected to the second network 199. Each of the electronic devices 102 and 104 may be of a type, which is the same as or different from the electronic device 101. According to an example embodiment, all or some of the operations executed in the electronic device 101 may be executed in another external electronic device or a plurality of external electronic devices. According to an example embodiment, in the case where the electronic device 101 should perform a certain function or service automatically or by a request, the electronic device 101 may request some functions, which are associated with the function or service, from an external electronic device, instead of, or in addition to, executing the functions or the service by itself. The external electronic device, which receives the request, may execute the requested functions or additional functions, and may transmit the results to the electronic device 101. The electronic device 101 may provide the requested functions or services by processing the received results as they are or additionally. For this purpose, for example, a cloud computing technique, a distributed computing technique, or a client-server computing technique may be used.

Figure 2:
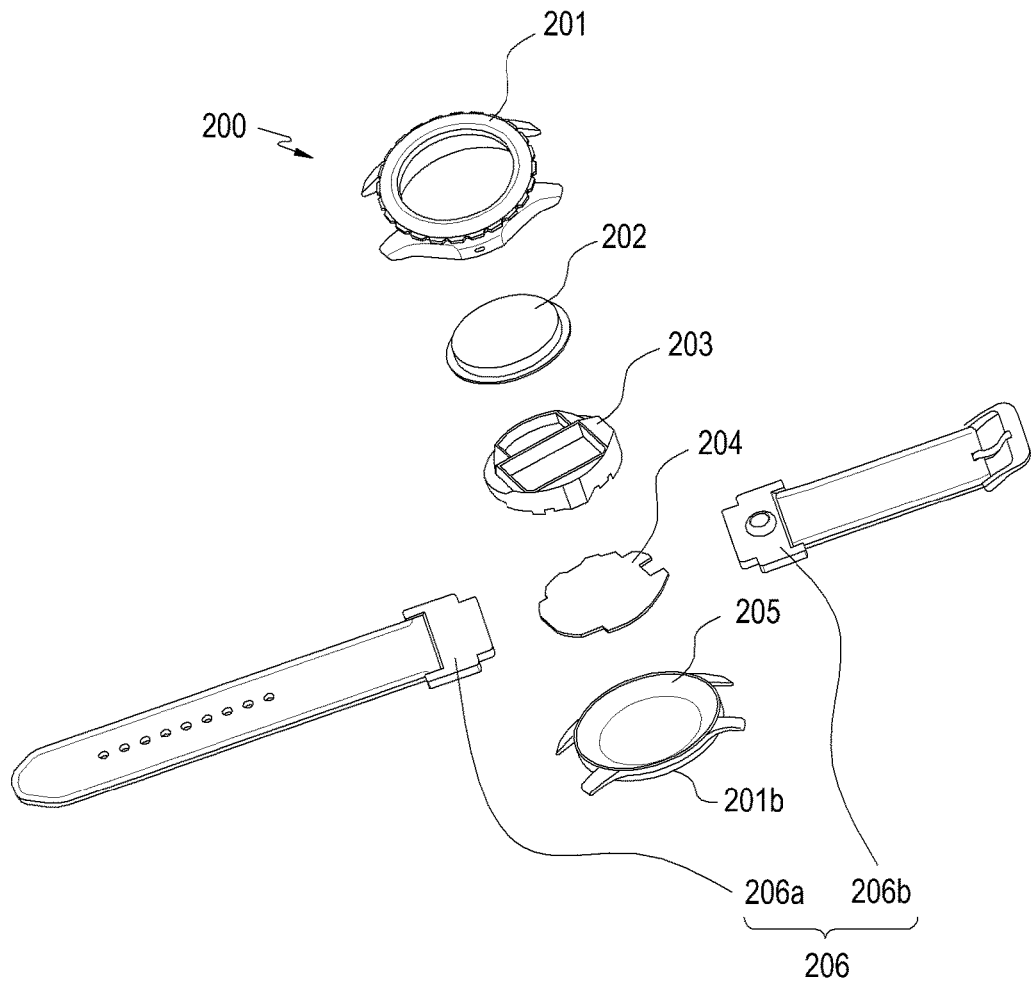
FIG. 2 is an exploded perspective view illustrating a wearable electronic device according to one of various embodiments.
Figure 3:
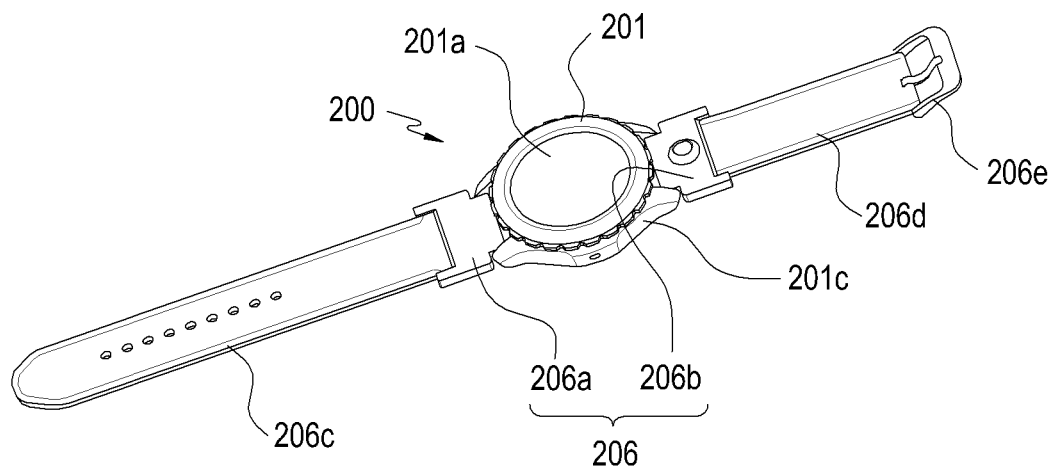
FIG. 3 is a perspective view illustrating the wearable electronic device according to one of various embodiments.

FIG. 2 is an exploded perspective view illustrating a wearable electronic device (e.g., the electronic device 101 of FIG. 1) according to one of various example embodiments. FIG. 3 is a perspective view illustrating the wearable electronic device according to one of various embodiments.

Referring to FIGS. 2 and 3, a wearable electronic device 200, according to one of various embodiments, may include a housing 201, a display 202, a support structure 203, a Printed Circuit Board (PCB) 204, a rear cover 205, and a band structure 206.

According to an example embodiment, the housing 201 may include a front plate 201a, a rear plate 201b, and a side member 201c. For example, a transparent window may be disposed on and/or be part of the front plate 201a. The front plate 201a may be formed of glass or resin (e.g., acryl or polycarbonate) so as to expose an image output from the display 202 to the outside. The rear plate 201b may be oriented in a direction opposite the front plate 201a. The side member 201c may enclose an inner space at least partially between the front plate 201a and the rear plate 201b. According to an example embodiment, various electronic components, such as the display 202, the support structure 203, and the PCB 204, may be mounted in the inner space of the housing 201. According to an example embodiment, the housing 201 may be formed of a metal material or a resin material. For example, a portion (e.g., a rim) of the housing 201 may be formed of a metal material, and another portion of the housing 201 may be formed of a resin material. According to an example embodiment, a portion of the housing 201 made of a metal material may be electrically connected to the PCB 204 so as to be utilized as an antenna radiator. According to an example embodiment, the housing 201 may have a ring shape. For example, a bezel may be disposed in the rim of the ring-shaped housing 201. The bezel may be rotatable along the rim of the housing 201. According to an example embodiment, the bezel may be made of a metal material and may be utilized as an antenna radiator.

According to an example embodiment, the display 202 (e.g., the display device 160 of FIG. 1) may be at least one of a Liquid Crystal Display (LCD), a Light-Emitting Diode (LED) display, an Organic Light-Emitting Diode (OLED) display, or a Micro-ElectroMechanical System (MEMS) display. According to an example embodiment, the display 202 may be provided with a touch panel so as to perform a touch screen function. According to an example embodiment, an antenna radiator may be mounted inside the display 202 so as to perform a wireless communication function. According to an example embodiment, the display 202 may be electrically connected to a display circuit board (not illustrated). The display circuit board may be disposed inside the housing 201. The display circuit board may be connected to the PCB 204 so as to transmit an electrical signal for driving the display 201.

According to an example embodiment, the support structure 203 is disposed in the inner space of the housing 201, and is capable of providing a space in which electronic components can be mounted, as well as reinforcing the rigidity of the housing 201. The support structure 203 may include a waterproof structure for sealing a gap between the support structure 203 and the housing 201. The support structure 203 may include a seating surface on which the waterproof structure is seated.

According to an example embodiment, the PCB 204 may be disposed in the inner space of the housing 201. According to an example embodiment, the PCB 204 may be disposed on the rear surface of the support structure 203. Electronic components such as a processor (e.g., the processor 120 of FIG. 1), a communication module (e.g., the communication module 190 of FIG. 1) and a sound output device (e.g., the sound output device 155 of FIG. 1) may be mounted on the PCB 204. According to an example embodiment, a battery (not illustrated) may be mounted inside the housing 201, and the PCB 204 may be electrically connected to the battery. The PCB 204 may be electrically connected to an antenna radiator via a connector.

According to an example embodiment, the housing 201 may include an antenna radiator or a wireless charging antenna therein. The antenna radiator may transmit/receive wireless signals using, for example, a Magnetic Secure Transmission (MST) method. For example, the antenna radiator may be an MST antenna. As another example, the antenna radiator may be a Near-Field Communication (NFC) antenna that transmits/receives a wireless signal in an NFC manner. A shielding structure may be disposed around the antenna radiator so as to prevent signal interference between the antenna radiator and the other electronic components, such as a sensor module. According to an example embodiment, the wireless charging antenna may be attached to one surface of the PCB 204. The wireless charging antenna may be in the form of, for example, a flat coil. The wireless charging antenna may be made of a conductive material, and may be electrically connected to the PCB 204. The wireless charging antenna may generate current by electromagnetic induction generated from an external electronic device. The current generated in the wireless charging antenna is able to charge the battery (not illustrated) through the PCB 204.

According to an example embodiment, the rear cover 205 may form a rear plate 201b of the housing 201. The rear cover 205 may come into contact with, for example, a portion of the human body (e.g., a wrist) when the wearable device is worn by a human user. According to an example embodiment, the rear cover 205 may be at least partially formed of a transparent glass material. For example, the transparent rear cover 205 may transmit light emitted from a sensor module (e.g., the sensor module 176 of FIG. 1) disposed inside the housing 201, so that the sensor module is capable of sensing an electrical signal for the user's body information. According to an example embodiment, the rear cover 205 is not limited to a glass material, and may be formed of various materials such as a resin or a metal.

According to an example embodiment, the band structure 206 may be detachably coupled to the housing 201. The band structure 206 may be of a form that can be worn, for example, on a portion of a human body, such as the wrist of a human user. The band structure 206 may include a first band structure 206a and a second band structure 206b. According to an example embodiment, a battery (not illustrated) may be mounted on the first band structure 206a. According to an example embodiment, a camera module (e.g., the camera module 180 of FIG. 1) may be mounted on the second band structure 206b. According to an example embodiment, the electronic components mounted on the first band structure 206a and the second band structure 206b are not limited to the battery or the camera module, and various electronic components such as a sensor module may be mounted thereon. According to an example embodiment, the band structure 206 may include band extensions 206c and 206d that extend away from the side member 201c of the housing 201. The extensions 206c and 206d may be fastened to each other by a fastening unit 206e. According to an example embodiment, the band structure 206 may be formed from a variety of materials such as, for example, rubber, plastic, metal, or leather.

Figure 4:
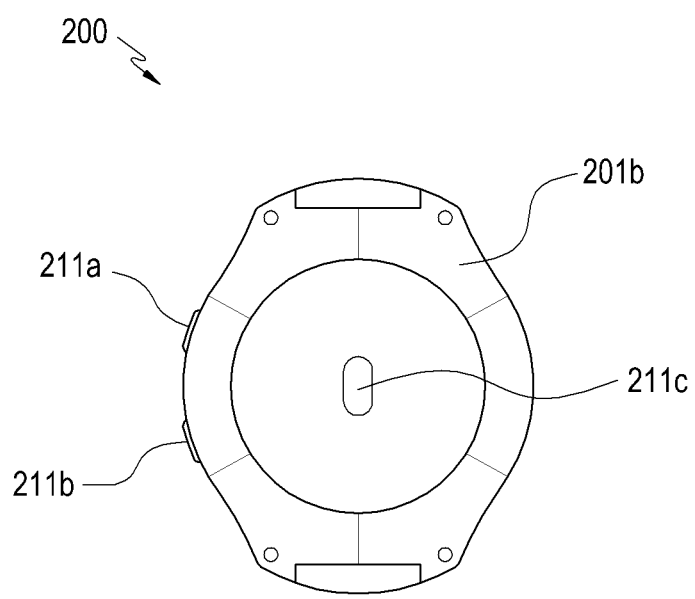
FIG. 4 is a rear view illustrating the wearable electronic device according to one of various embodiments.
Figure 6:
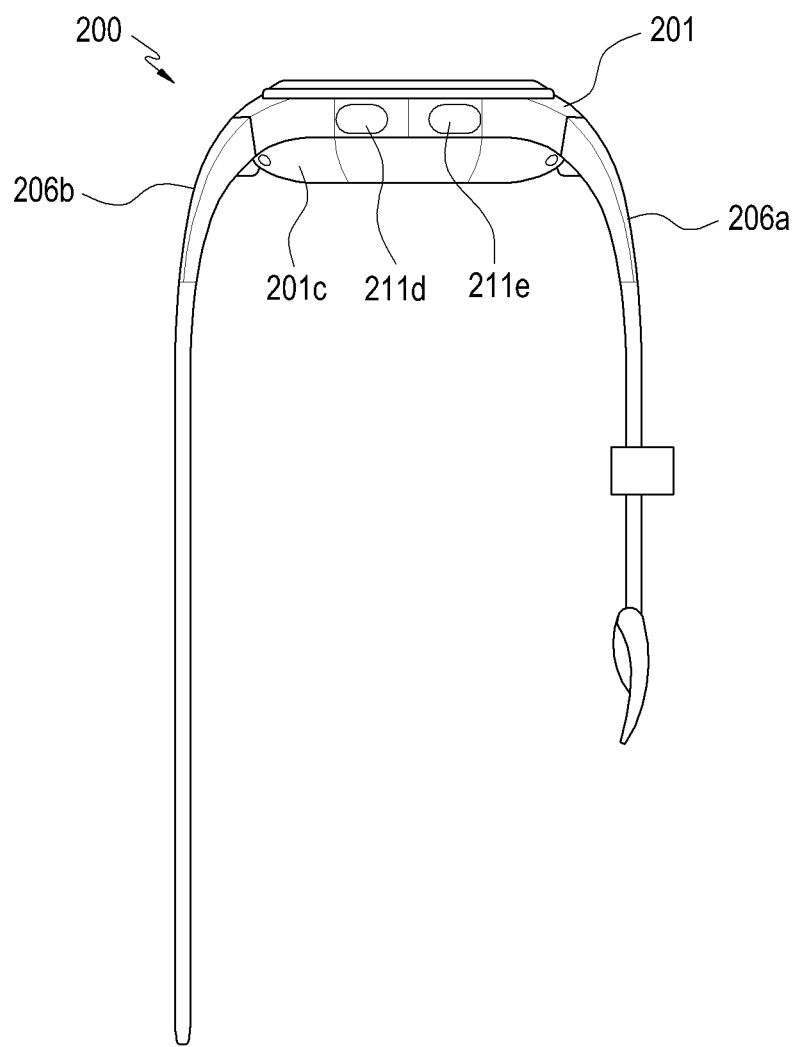
FIG. 6 is a side view illustrating the wearable electronic device according to one of various embodiments, which is viewed from another side.

FIG. 4 is a rear view illustrating a wearable electronic device (e.g., the electronic device 200 of FIG. 2) according to one of various embodiments. FIG. is a side view illustrating the wearable electronic device according to one of various embodiments. FIG. 6 is a side view illustrating the wearable electronic device according to one of various embodiments, which is viewed from another side.

Figure 5:
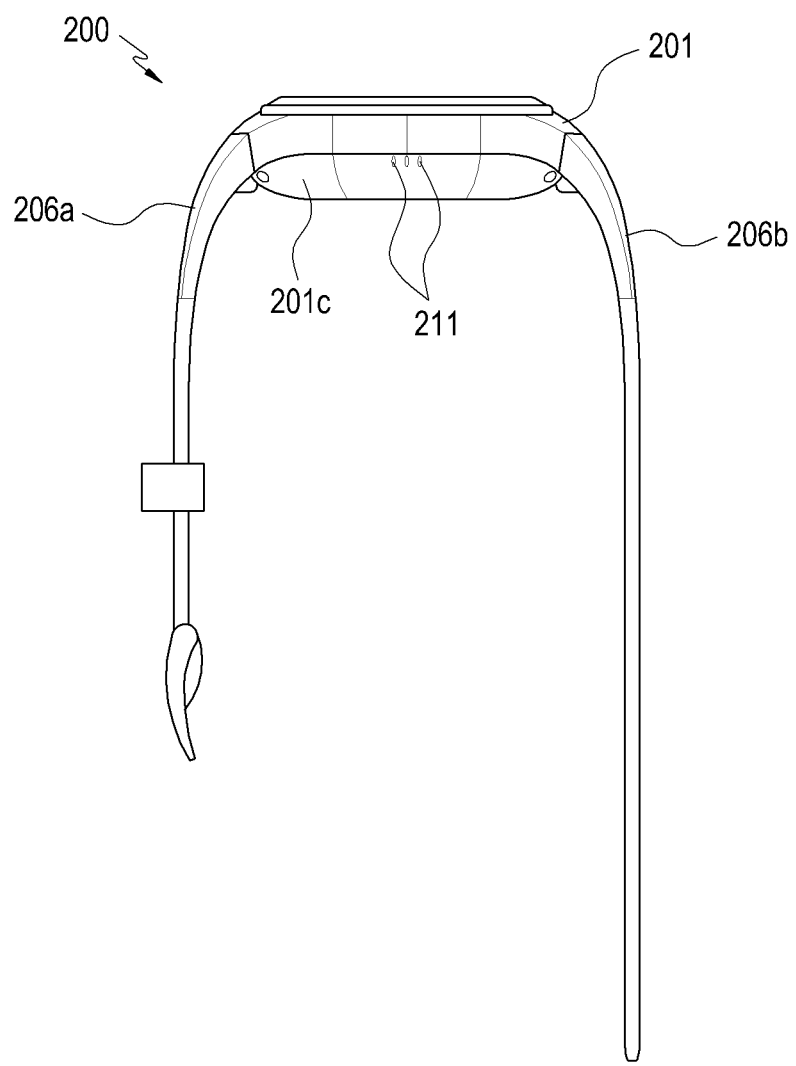
FIG. 5 is a side view illustrating the wearable electronic device according to one of various embodiments.

Referring to FIGS. 4 to 6, a wearable electronic device, according to one of various embodiments, may be the same or similar to the wearable electronic device 200 illustrated in FIG. 2.

According to an example embodiment, the rear plate (e.g., the rear plate 201b in FIG. 2) of the housing 201 may be formed of a transparent material. A sensor module 211c may be mounted inside the housing 201. The sensor module 211c is capable of sensing the user's body information. For example, the sensor module 211c may sense the user's body information as an electric signal by emitting light to a portion of the human body (e.g., a wrist) and then sensing the light reflected by the portion of the human body. The sensor module 211c may be electrically connected to the PCB (e.g., the PCB 204 of FIG. 2), and may transmit the electrical signal for the user's body information to the processor (e.g., the processor 120 of FIG. 1). The processor may determine the user's body information through the electrical signal for the user's signal information.

According to an example embodiment, the side member 201c of the housing 201 may have a plurality of holes 211 formed therein. The plurality of holes 211 may provide a path through which sounds, output from a sound component (not illustrated) mounted in the housing 201, are discharged. According to an example embodiment, at least one of the plurality of holes 211 may be a microphone hole that provides a path through which sound moves to a microphone (not illustrated) mounted inside the housing 201.

According to an example embodiment, function keys 211d and 211e may be disposed on the side member 201c of the housing 201. For example, the function keys 211d and 211e may include a power key 211d for turning on/off the power source of the wearable electronic device 200 or a menu key 211e for selecting various menus of the wearable electronic device. According to an example embodiment, the function keys 211d and 211e are not limited to the power key and the menu key, and may be various function keys for operating the wearable electronic device such as a volume control key.

Figure 7:
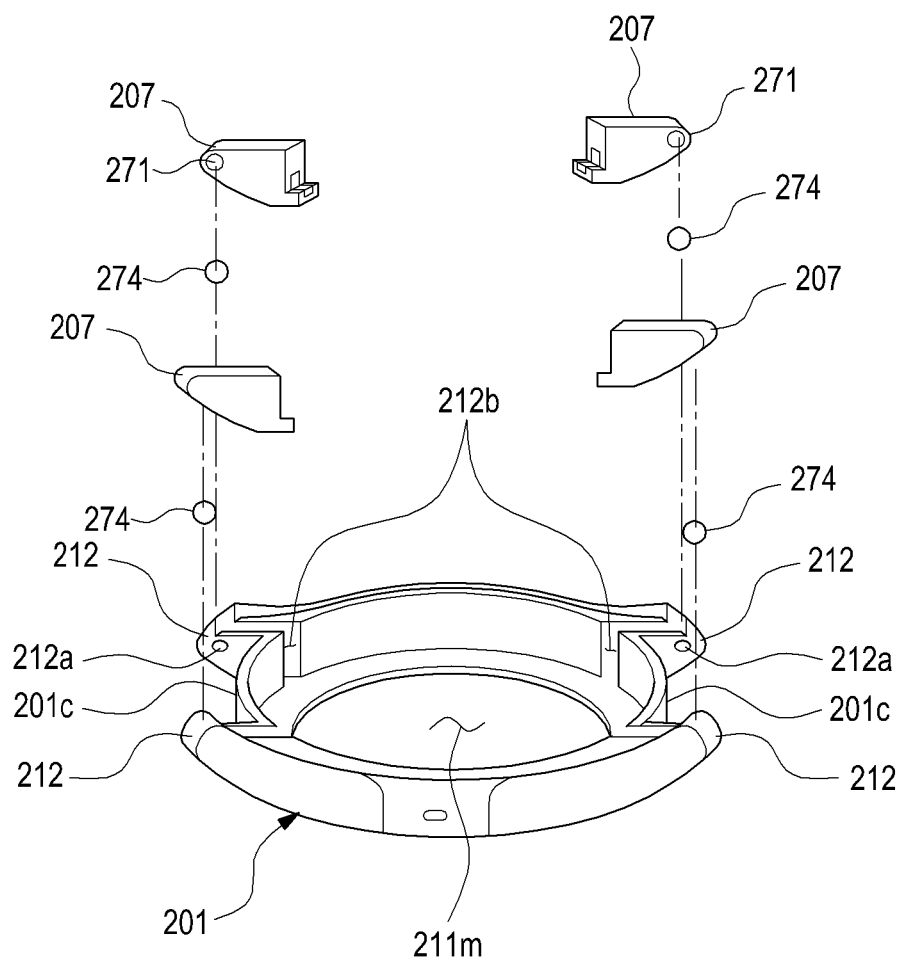
FIG. 7 is an exploded perspective view illustrating a housing, insulating structures, and first sealing members of the wearable electronic device according to one of various embodiments.

FIG. 7 is an exploded perspective view illustrating a housing (e.g., the housing 201 of FIG. 2), insulating structures (or insulators) 207, and sealing members 274 of a wearable electronic device (e.g., the wearable electronic device 200 of FIG. 2).

Referring to FIG. 7, the wearable electronic device (e.g., the wearable electronic device 200 in FIG. 2), according to certain example embodiments, may include a housing 201, insulating structures 207, conductive paths 271, and sealing members 274.

According to an example embodiment, a side member (e.g., the side member 201c of FIG. 3) of the housing 201 may include at least one portion 212 protruding from the side member. According to an example embodiment, the at least one portion 212 may be provided in a plurality. For example, the plurality of portions 212 may be formed symmetrically with respect to each other relative to a center of the electronic device. A band structure (e.g., the band structure 206 of FIG. 2) may be disposed between the plurality of portions 212 and/or be coupled to the plurality of portions 212. According to an example embodiment, the at least one portion 212 may include an external opening 212a and an inner channel 212b. The external opening 212a may be disposed in one surface of the at least one portion 212. The inner channel 212b may connect the external opening 212a and the inner space 211m of the housing 201 to each other.

According to an example embodiment, the insulating structures 207 may be inserted into the inner channels 212b. The insulating structures 207 may be formed of, for example, a resin or a silicon material. The insulating structures 207 are capable of blocking the entrance of foreign matter (e.g., water) into the inner space 211 of the housing 201 through the external openings 212a.

According to an example embodiment, the conductive paths 271 may be partially embedded in the insulating structures 207. Each of the conductive paths 271 may include a first end exposed to the inner space 211m and a second end exposed to an external opening 212a.

According to an example embodiment, each sealing member 274 may be disposed between one of the insulating structures 207 and one surface of one of the inner channels 212 around the external openings 212a. The sealing members 274 may be referred to as first sealing members (or first seals) 274, in order to distinguish them from other sealing members to be described later. The first sealing members 274 may be formed in an O-ring shape. The first sealing members 274 may be formed of a resin or a silicon material. The first sealing members 274 are not limited to resin or silicon, and may be formed of various materials that are elastic but do not conduct electricity. Each of the first sealing members 274 is disposed between one surface of one of the inner channels 212 and one of the insulating structures 207 and is capable of blocking the entrance of external foreign matter (e.g., water) into the inner space 211m through the external openings 212a. According to an example embodiment, each of the first sealing members 274 may include a sealant disposed on the surface of one of the inner channels 212b.

Figure 8:
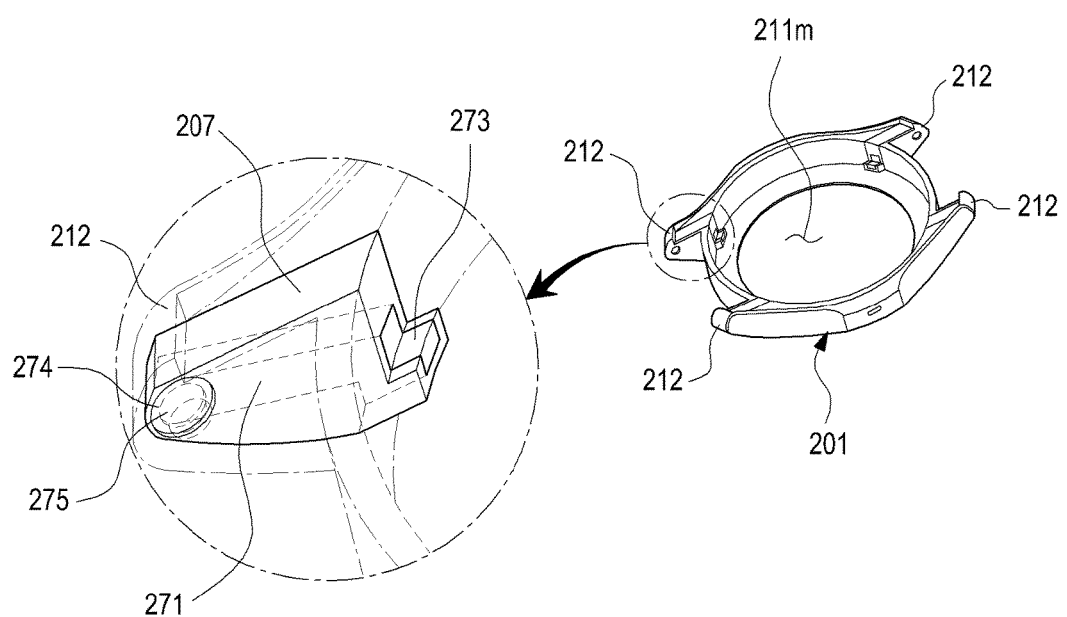
FIG. 8 is a perspective view illustrating the wearable electronic device according to one of various embodiments in the state in which an insulating structure and a first sealing member are mounted in the housing.
Figure 9:
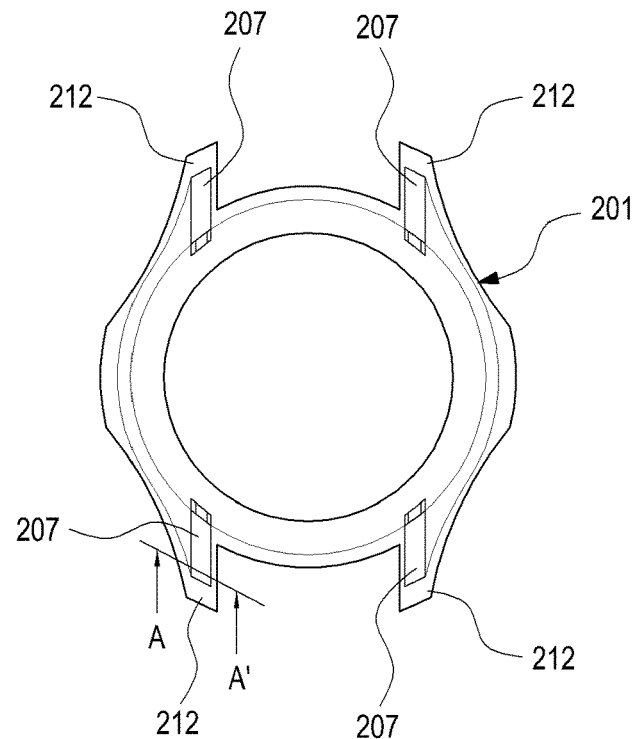
FIG. 9 is a front view illustrating the wearable electronic device according to one of various embodiments in the state in which the insulating structures and the first sealing members are mounted in the housing.
Figure 10:
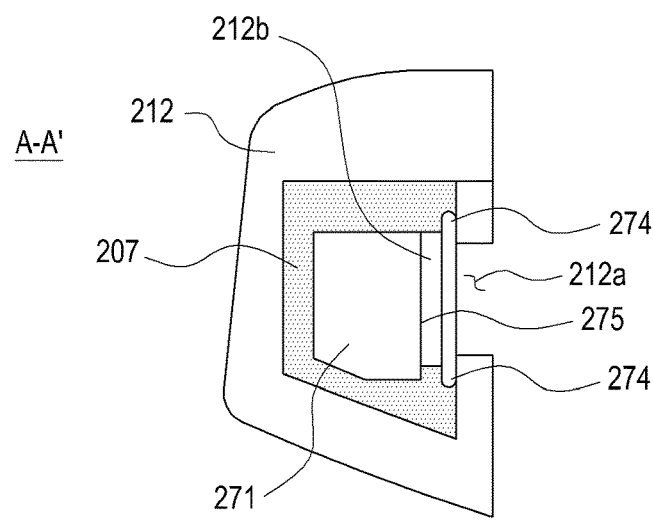
FIG. 10 is a cross-sectional view of a portion of the wearable electronic device according to one of various embodiments, which is taken along line A-A' in FIG. 9.

FIG. 8 is a perspective view in which an insulating structure (e.g., the insulating structure 207 of FIG. 7) and a first sealing member (e.g., the first sealing member 274 in FIG. 7) of a wearable electronic device (e.g., the wearable electronic device 200 of FIG. 2) are mounted in a housing (e.g., the housing 201 in FIG. 7). FIG. 9 is a front view illustrating the wearable electronic device according to one of various embodiments in the state in which the insulating structures and the first sealing members are mounted in the housing. FIG. 10 is a cross-sectional view of a portion of the wearable electronic device according to one of various embodiments, which is taken along line A-A' in FIG. 9.

Referring to FIGS. 8 to 10, the insulating structure 207 is inserted into each inner channel (e.g., the inner channel 212b of FIG. 7) and is capable of blocking the entrance of foreign matter into the inner space 211m of the housing 201 through the external openings (e.g., the external openings 212a of FIG. 7). According to an example embodiment, the insulating structure 207 cuts off electrical connection between the housing 201, which is made of a metal, and the conductive path 271, so that antenna radiation performance can be stably secured even if the housing 201 made of the metal is utilized as an antenna radiator.

According to an example embodiment, the conductive path 271 may include a first end 273 and a second end 275. The first end 273 of the conductive path 271 may be exposed to the inner space 211m of the housing 201. The first end 273 may be electrically connected to a PCB (e.g., the PCB 204 of FIG. 2) mounted in the housing 201. The second end 275 of the conductive path is exposed to the external opening (e.g., the external opening 212a of FIG. 7) so as to be electrically connected to a conductive rod (e.g., the conductive rod 262 of FIG. 14) inserted into the external opening. For example, the first end 273 of the conductive path 271 may be electrically connected to the PCB (e.g., the PCB 204 of FIG. 2) mounted in the inner space 211m of the housing and the second end 275 of the conductive path 271 may be electrically connected to a conductor located outside the housing 201. The conductor located outside the housing 201 may be electrically connected to an electronic circuit (e.g., the electronic circuit 204 of FIG. 2) through the conductive path 271.

According to an example embodiment, the first sealing member 274 may be disposed between the insulating structure 207 and one surface of the inner channel (e.g., the inner channel 212b of FIG. 10). The first sealing member 274 is capable of blocking the entrance of external foreign matter (e.g., water) into the inner space 211m through the space between the insulating structure 207 and the portion 212.

Figure 11A:
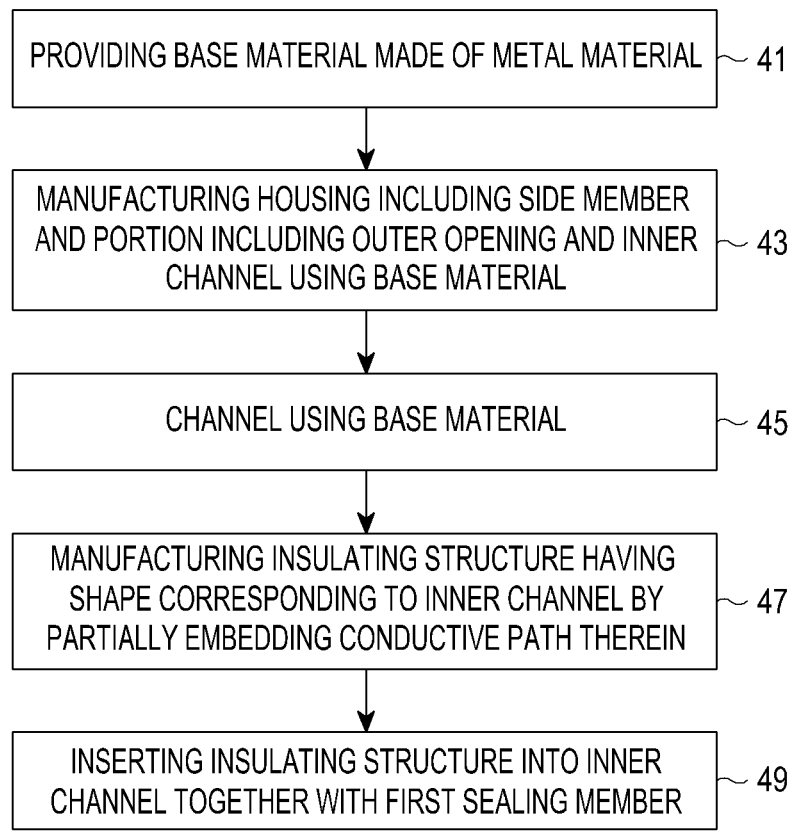
FIG. 11A is a flowchart illustrating a method of manufacturing a housing according to one of various embodiments.

FIG. 11A is a flowchart illustrating a method of manufacturing a housing (e.g., the housing 201 of FIG. 9) according to one of various embodiments.

Referring to FIG. 11A, a method of manufacturing a housing (e.g., the housing 201 of FIG. 9), according to another one of the various embodiments, may include providing a base material made of a metal material (step 41).

According to an example embodiment, a housing (e.g., the housing 201 of FIG. 9), which includes a side member (e.g., the side member 201c of FIG. 3) and a portion (e.g., the portion 212 of FIG. 9) including the external opening (e.g., the external opening 212a of FIG. 7) and the inner channel (e.g., the inner channel 212b of FIG. 7), may be manufactured using the base material (step 43).

According to an example embodiment, a conductive path (e.g., the conductive path 271 of FIG. 8) may be provided (step 45).

According to an example embodiment, an insulating structure (e.g., the insulating structure 207 of FIG. 7, in which the conductive path 271 is partly embedded and which has a shape corresponding to the inner channel (e.g., the inner channel 212b of FIG. 7), may be manufactured (step 47).

According to an example embodiment, the insulating structure 207 may be inserted into the inner channel 212b together with a first sealing member (e.g., the first sealing member 274 of FIG. 7) (step 49).

Figure 11B:
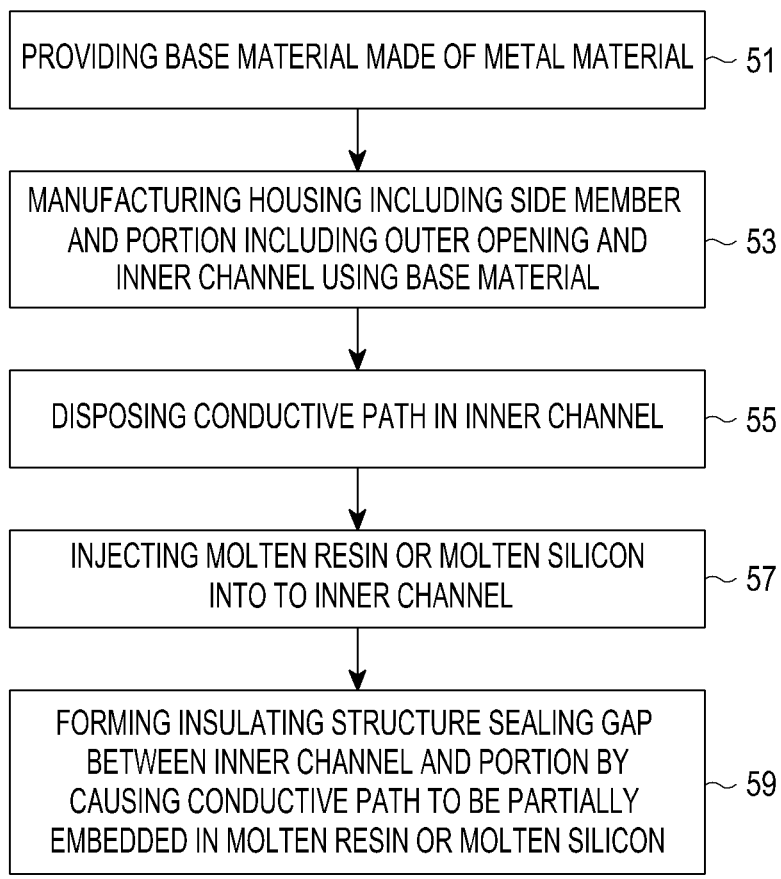
FIG. 11B is a flowchart illustrating a method of manufacturing a housing according to another one of various embodiments.

FIG. 11B is a flowchart illustrating a method of waterproofing the housing according to another one of various embodiments.

Referring to FIG. 11B, a method of manufacturing a housing (e.g., the housing 201 of FIG. 9), according to another one of the various embodiments, may include providing a base material made of a metal material (step 51).

According to an example embodiment, a housing (e.g., the housing 201 of FIG. 9), which includes a side member (e.g., the side member 201c of FIG. 3) and a portion (e.g., the portion 212 of FIG. 9) including the external opening (e.g., the external opening 212a of FIG. 7) and the inner channel (e.g., the inner channel 212b of FIG. 7), may be manufactured using the base material (step 53).

According to an example embodiment, a conductive path 271 may be disposed in the inner channel (e.g., the inner channel 212b of FIG. 7) (step 55).

According to an example embodiment, molten resin or molten silicon may be injected into the inner channel (e.g., the inner channel 212b of FIG. 7) (step 57).

According to an example embodiment, as the molten resin or the molten silicon is partially embedded in the conductive path (e.g., the conductive path 271 of FIG. 8), an insulating structure (e.g., the insulating structure 207 of FIG. 7), which seals a gap between the inner channel (e.g., the inner channel 212b of FIG. 7) and the portion (e.g., the portion 212 of FIG. 9), may be disposed (step 59).

According to an example embodiment, when a portion of the conductive path 271 excessively protrudes from the insulating structure 207, the conductive path 271 may be partially cut.

Figure 12:
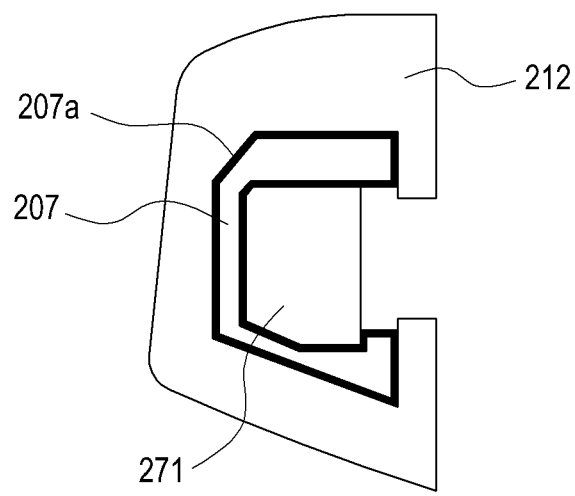
FIG. 12 is a cross-sectional view of a portion of the wearable electronic device according to another one of various embodiments, which is taken along line A-A' in FIG. 9.

FIG. 12 is a cross-sectional view of a portion the wearable electronic device according to another one of various embodiments, which is taken along line A-A' in FIG. 9.

Referring to FIG. 12, the insulating structure 207 may be attached to the inner wall of the portion 212 of the housing (e.g., the housing 201 of FIG. 2) using an adhesive layer 207a. The adhesive layer 207a may be formed of double-sided tape or an adhesive member. The adhesive layer 207a may seal a gap between the insulating structure 207 and the inner wall of the portion 212 in addition to securing the insulating structure 207 to the portion 212.

Figure 13:
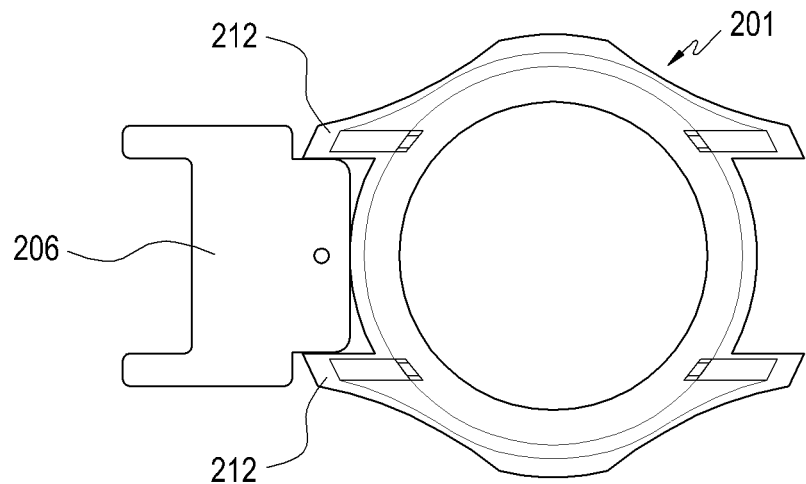
FIG. 13 is a front view illustrating a portion of a housing and a band structure of the wearable electronic device according to one of various embodiments.
Figure 14:
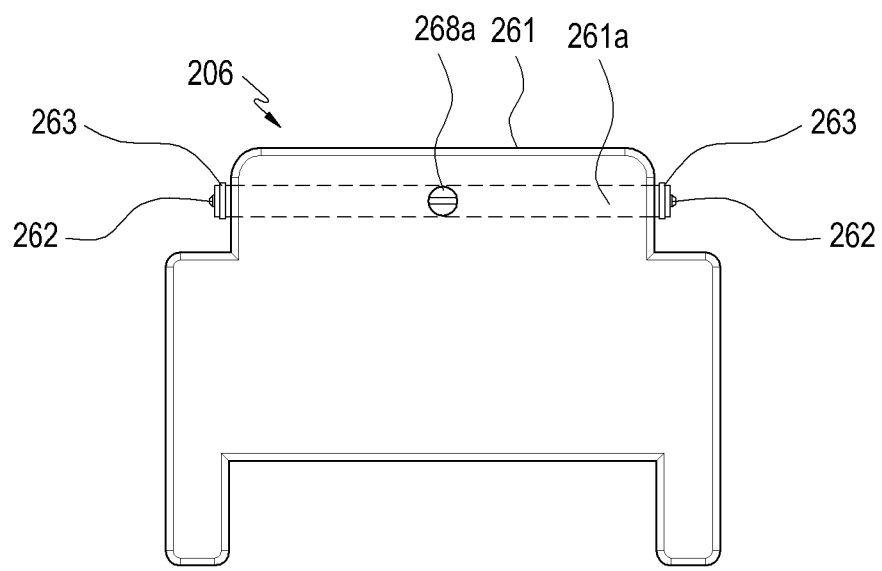
FIG. 14 is a front view illustrating a portion of the band structure of the wearable electronic device according to one of various embodiments.
Figure 15:
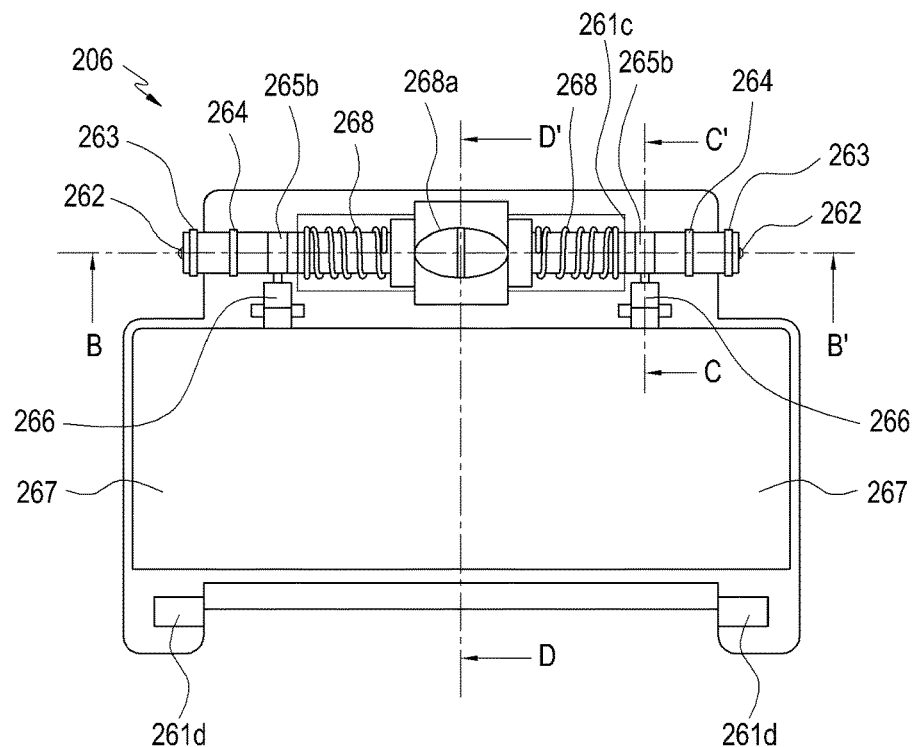
FIG. 15 is a front view illustrating an inner portion of the band structure of the wearable electronic device according to one of various embodiments.

FIG. 13 is a front view illustrating a housing (e.g., the housing 201 of FIG. 2) and a portion of a band structure (e.g., the band structure 206 of FIG. 2) of a wearable electronic device (e.g., the wearable electronic device 200 of FIG. 2) according to one of various embodiments. FIG. 14 is a front view illustrating a portion of the band structure of the wearable electronic device according to one of various embodiments. FIG. 15 is a front view illustrating an inner portion of the band structure of the wearable electronic device according to one of various embodiments.

Referring to FIGS. 13 to 15, a band structure 206, according to one of various embodiments, may include a body portion 261, an electronic component 267, a conductive rod 262, a connection terminal 266, and a second sealing member (or a second seal) 264. According to an example embodiment, the band structure 206 may be detachably coupled to the portions 212 of the housing 201 using a spring structure. The band structure 206, according to an example embodiment, may further include at least one of an elastic member 268, a cam structure 268a, and a third sealing member (or a third seal) 263. At least one electronic component 267 among a battery 267, a sound component, a camera, and a sensor may be mounted in the body portion 261, and a description will be made assuming that the electronic component 267 is the battery 267.

According to an example embodiment, the conductive rod 262 may be formed in a cylindrical shape with a longitudinal direction. The conductive rod 262 may be inserted so that it may be movable inward of the external opening (e.g., the external opening 212a of FIG. 7). According to an example embodiment, the conductive rod 262 is not limited to a cylindrical shape, and may be formed in various shapes with a longitudinal direction. According to an example embodiment, the conductive rod 262 may be provided so as to be movable in the longitudinal direction inside the body portion 261. For example, the conductive rod 262 may be moved along the second opening 261a formed in the body portion 261. When the conductive rod 262 protrudes to the outside of the body portion 261, the conductive rod 262 may be inserted into the external opening (e.g., the external opening 212a of FIG. 7) of the housing 201. As the conductive rod 262 is inserted into the external opening 212a, the body portion 261 may be coupled to the portion 212 of the housing 201.

According to an example embodiment, the conductive rod 262 may extend along one axis and may be movable between a first position and a second position along the axis. The conductive rod 262 may be configured so as to be electrically connected to the electronic component 267 at the first position and so as to be detached from the electronic component 267 at the second position.

According to an example embodiment, the connection terminal 266 may electrically connect the conductive rod 262 and the electronic component 267 to each other by contacting the electronic component 267 while contacting the conductive rod 262.

According to an example embodiment, the elastic member 268 may provide an elastic force such that the conductive rod 262 faces the outside of the body portion 261. For example, when the housing 201 and the body portion 261 are coupled, the elastic member 268 may press the conductive rod 262 toward the external opening 212a. The elastic member 268 may be disposed between a latch portion 261c of the body portion 261 and one end of the conductive rod 262. The elastic member 268 may press one end of the conductive rod 262 such that the conductive rod 262 faces the external opening 212a.

According to an example embodiment, the cam structure 268a may be mounted inside the body portion 261. The cam structure 268a may be coupled to the body portion 261 such that it may be rotatable about the center of the cam structure 268a. The cam structure 268a may come into contact with one end of the conductive rod 262. For example, a pair of conductive rods 262 may be mounted in the body portion 261, and the cam structure 268a may be disposed between the pair of conductive rods 262. One end of each of the pair of conductive rods 262 may be in contact with the cam structure 268a.

According to an example embodiment, the second sealing member 264 may be wrapped around the outer circumferential surface of the conductive rod 262. For example, when the conductive rod 262 has a cylindrical shape, the second sealing member 264 may be formed in an O-ring shape. According to an example embodiment, the second sealing member 264 is not limited to being formed in an O-ring shape and may be formed in various shapes enclosing the conductive rod 262. The second sealing member 264 may be formed of, for example, a resin or a silicon material. According to an example embodiment, the second sealing member 264 is not limited to being formed of a resin or a silicon material and may be formed of various elastic materials. According to an example embodiment, the second sealing member 264 may seal a gap between the second opening 261a and the conductive rod 262. The second sealing member 264 is capable of blocking the entrance of foreign matter (e.g., water) into the inside of the body portion 261 through the second opening 261a.

According to an example embodiment, the third sealing member 263 may be disposed adjacent to one end of a protruding portion of the body portion 261 of the conductive rod 262. For example, when the conductive rod 262 is moved to protrude out of the body portion 261, the third sealing member 263 may be exposed to the outside of the body portion 261. The third sealing member 263 may be wrapped around the outer circumferential surface of the conductive rod 262. For example, when the conductive rod 262 is cylindrical, the third sealing member 263 may be formed in an O-ring shape. According to an example embodiment, the third sealing member 263 is not limited to being formed in an O-ring shape and may be formed in various shapes enclosing the conductive rod 262. The third sealing member 263 may be formed of a resin or a silicon material. According to an example embodiment, the third sealing member 263 is not limited to being formed of a resin or a silicon material and may be formed of various elastic materials. According to an example embodiment, when the housing 201 and the body portion 261 are coupled, the third sealing member 263 is capable of sealing a gap between the external opening 212a and the conductive rod 262. For example, the third sealing member 263 is capable of blocking the entrance of foreign matter (e.g., water) outside the housing 201 through a gap between the external opening 212a and the conductive rod 262.

According to an example embodiment, a fastening groove 261d may be formed on the body portion 261. A connection pin (not illustrated) of an extension (e.g., the extension 206c or 206d of FIG. 3) with a material such as a metal or leather may be inserted into fastening grooves 261d.

According to an example embodiment, the electronic component 267 is electrically connected to the PCB (e.g., the PCB 204 of FIG. 2) of the housing 201 via the connection terminal 266, the conductive rod 262, and the conductive path (e.g., the conductive path 271 in FIG. 8).

Figure 16:
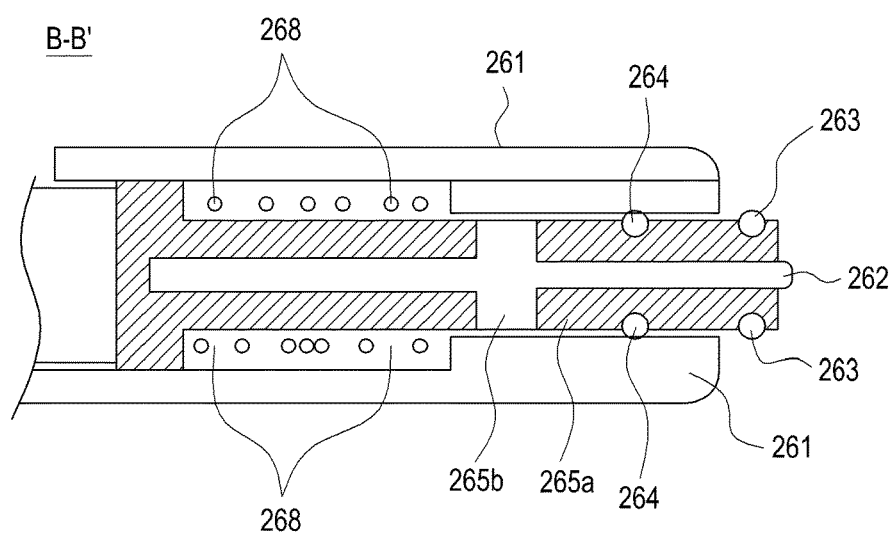
FIG. 16 is a cross-sectional view of a portion of the band structure according to one of various embodiments, which is taken along line B-B' in FIG. 15.
Figure 17:
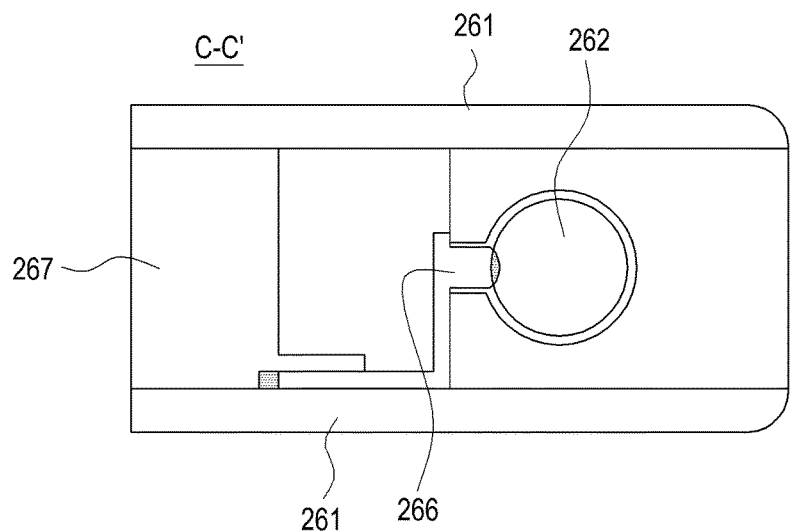
FIG. 17 is a cross-sectional view of a portion of the band structure according to one of various embodiments, which is taken along line C-C' in FIG. 15.

FIG. 16 is a cross-sectional view of a portion of the band structure according to one of various embodiments, which is taken along line B-B' in FIG. 15. FIG. 17 is a cross-sectional view of a portion of the band structure according to one of various embodiments, which is taken along line C-C' in FIG. 15.

Referring to FIGS. 16 and 17, the conductive rod 262 may include an insulating member 265a or a conductive member 265b. According to an example embodiment, the insulating member 265a may partially enclose the outer circumferential surface of the conductive rod 262. The insulating member 265a may be formed of, for example, a resin or a silicon material that is not electrically conductive. According to an example embodiment, the conductive member 265b may be partly exposed to the outer circumferential surface of the conductive rod 262. For example, the connection terminal 266 may be in contact with the conductive member 265b so as to electrically connect the electronic component 267 and the conductive rod 262.

Figure 18:
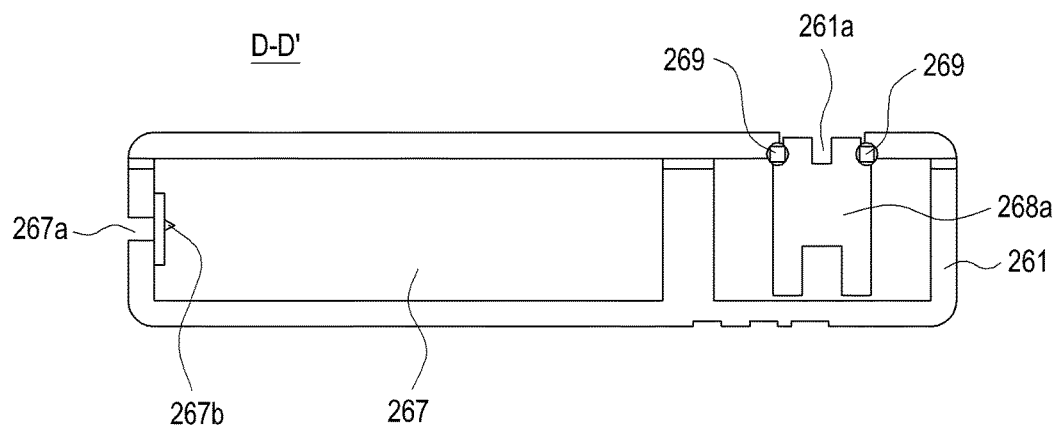
FIG. 18 is a cross-sectional view of a portion of the band structure according to one of various embodiments, which is taken along line D-D' in FIG. 15.

FIG. 18 is a cross-sectional view of a portion of the band structure according to one of various embodiments, which is taken along line D-D' in FIG. 15.

Referring to FIG. 18, the band structure (e.g., the band structure of FIG. 14), according to various embodiments, may include a fourth sealing member (or a fourth seal) 269 and a membrane 267b. A third opening 261a may be disposed on the front surface of the body portion (e.g., the body portion 261 of FIG. 14). One surface of the cam structure 268a may be exposed through the third opening 261a. The fourth sealing member 269 may seal a gap between the third opening 261a and the cam structure 268a. The fourth sealing member 269 is capable of blocking the entrance of foreign matter (e.g., water) into the body portion 261 through the third opening 261a.

According to an example embodiment, a through hole 267a may be formed in a side surface of the body portion 261. The membrane 267b may cover the through hole 267a. The membrane 267b is capable of blocking the entrance of foreign matter (e.g., water) into the body portion 261 through the through hole 267a while allowing air inside the body portion 261 to be discharged. The heat generated from the electronic component 267 may expand the air inside the body portion 261 to increase the pressure inside the body portion 261. There is a possibility that the electronic component 267 may become damaged by the increased pressure inside the body portion 261. Since the heat generated from the electronic component 267 is discharged to the outside of the body 261 through the through hole 267a, the membrane 267b is capable of preventing the electronic component 267 from being damaged. According to an example embodiment, the membrane 267b is capable of maintaining the pressure inside and outside of the body portion 261 by discharging the air inside the body portion 261 through the through hole 267a. The membrane 267b is capable of blocking the entrance of foreign matter (e.g., water) outside the body portion 261 into the body portion 261 through the through hole 267a.

Figure 19:
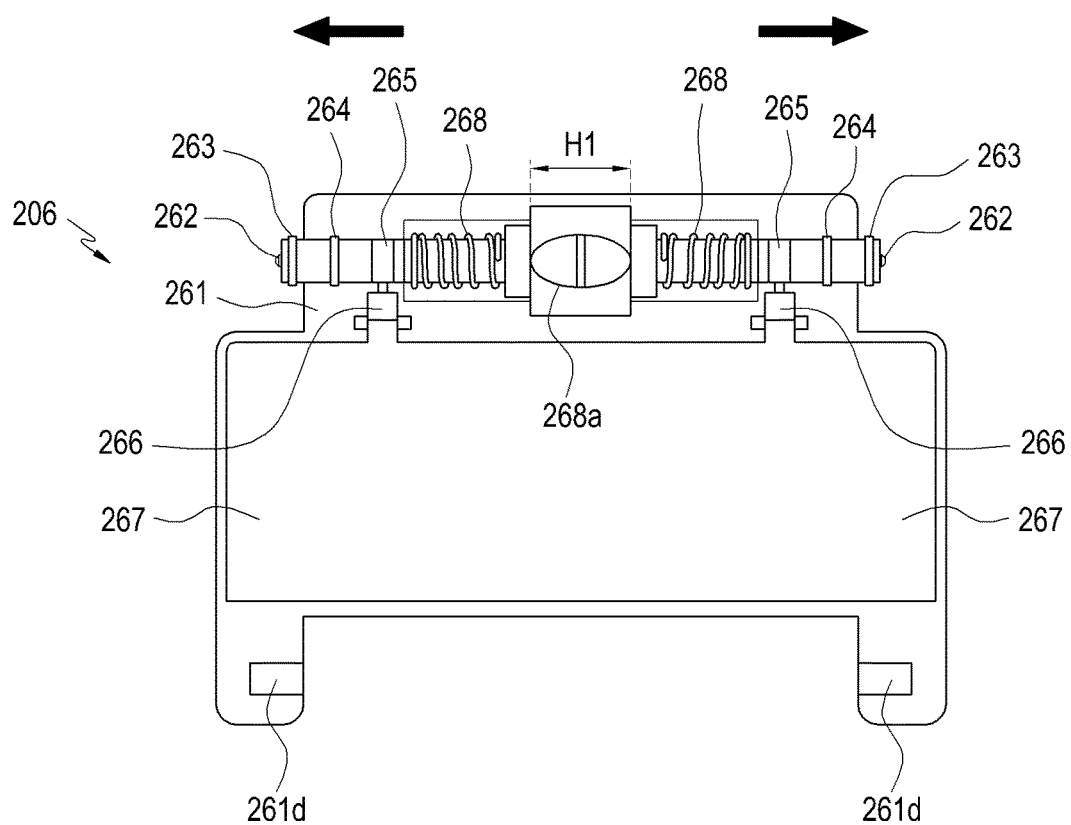
FIG. 19 is a view illustrating a state in which conductive rods of the band structure according to one of various embodiments are moved to the outside.
Figure 20:
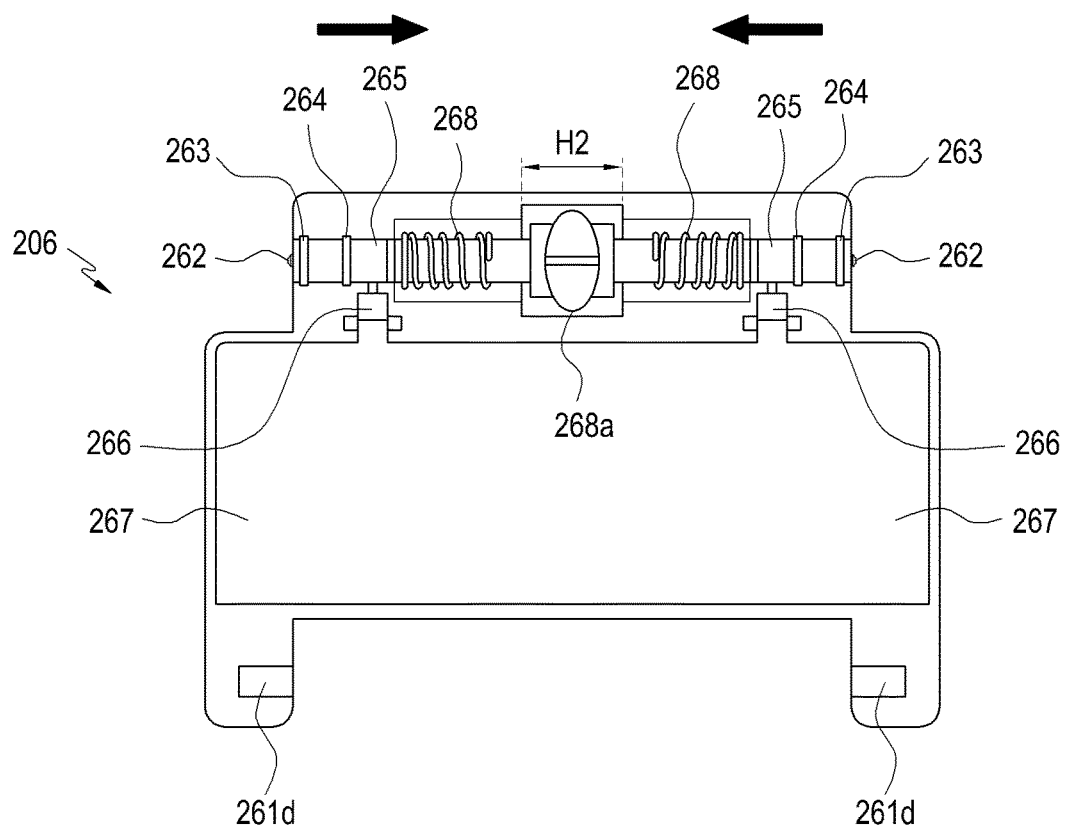
FIG. 20 is a view illustrating a state in which the conductive rods of the band structure according to one of various embodiments are moved to the inside.

FIG. 19 is a view illustrating a state in which conductive rods of the band structure, according to one of various embodiments, are moved to the outside. FIG. 20 is a view illustrating a state in which the conductive rods of the band structure, according to one of various embodiments, are moved to the inside.

Referring to FIGS. 19 and 20, the cam structure 268a may have a first outer diameter H1 and a second outer diameter H2. According to an example embodiment, when the cam structure 268a is rotated such that the first outer diameter H1 is oriented in a direction parallel to the conductive rod 262, the cam structure 268a may press one end of each of the conductive rods 268a. In this case, each elastic member 268 is compressed, and the other end of each of the conductive rods 262 may be moved to protrude to the outside of the body portion 261. According to an example embodiment, the second outer diameter H2 may be smaller than the first outer diameter H1. According to an example embodiment, when the cam structure 268a is rotated such that the second outer diameter H2 is oriented in a direction parallel to the conductive rod 262, the elastic structure 268 may press the conductive rods 268a. In this case, the elastic member 268 expands, and at least a portion of the conductive rod 262 may be moved so that it may be received inside the body portion 261.

Figure 21:
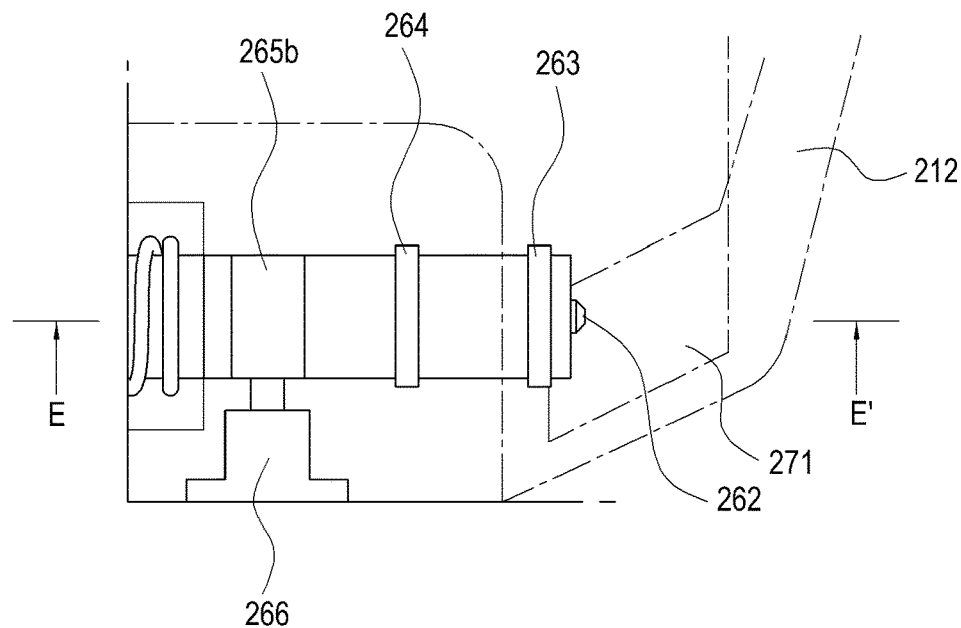
FIG. 21 is a view illustrating a state in which the conductive rod of the band structure according to one of various embodiments is coupled to a portion of the housing.
Figure 22:
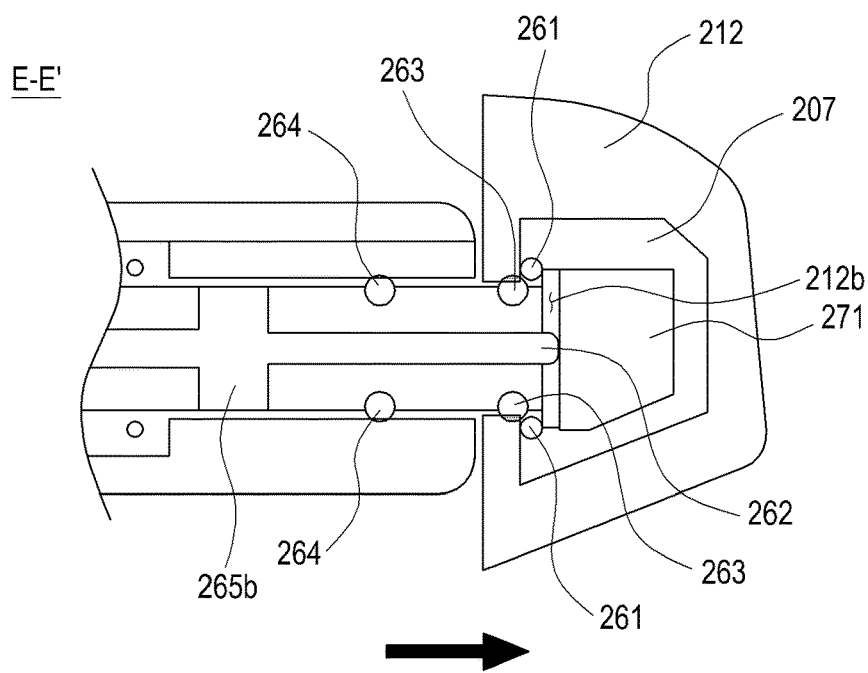
FIG. 22 is a cross-sectional view of a portion of the band structure according to one of various embodiments, which is taken along line E-E' in FIG. 21.

FIG. 21 is a view illustrating a state in which the conductive rod of the band structure according to one of various embodiments is coupled to a portion of the housing. FIG. 22 is a cross-sectional view of a portion of the band structure according to one of various embodiments, which is taken along line E-E' in FIG. 21.

Referring to FIGS. 21 and 22, the conductive rod 262 may be inserted into the inner channel 212b while being moved to a first position where the conductive rod 262 protrudes to the outside of the body portion (e.g., the body portion 261 in FIG. 19). The third sealing member 263 is capable of sealing a gap between the portion 212 and the conductive rod 262. As another example, the third sealing member 263 may maintain the state in which the conductive rod 262 is coupled to the portion 212. According to an example embodiment, the conductive rod 262 may rotatably couple the housing (e.g., the housing 201 of FIG. 13) and the body portion 261. As the other end of the conductive rod 262 comes into contact with the conductive path 271, the conductive rod 262 can be electrically connected to the conductive path 271. As the conductive rod 262 is placed in the first position, the conductive member 265b of the conductive rod 262 may come into contact with the connection terminal 266.

Figure 23:
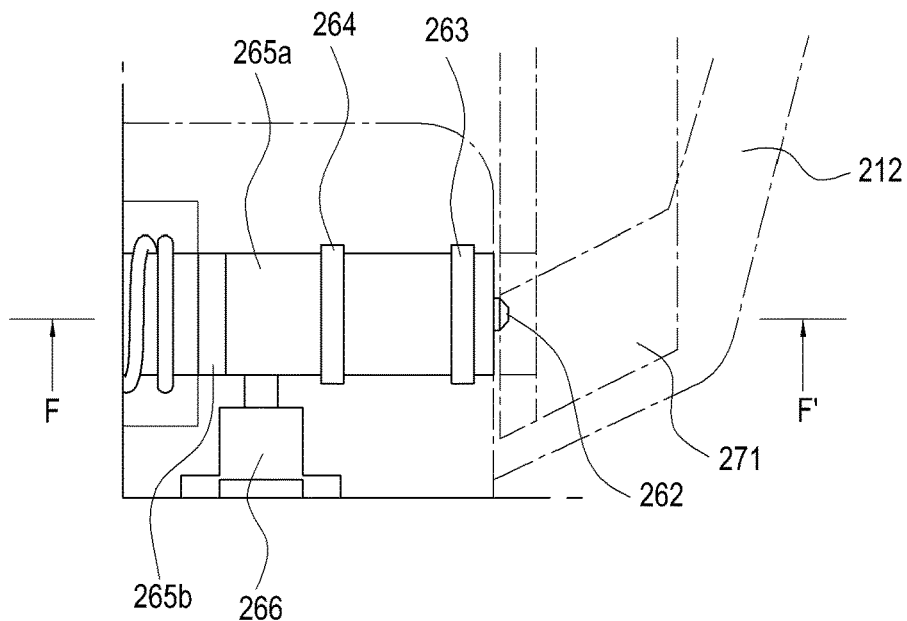
FIG. 23 is a view illustrating a state in which the conductive rod of the band structure according to one of various embodiments is separated from a portion of the housing.
Figure 24:
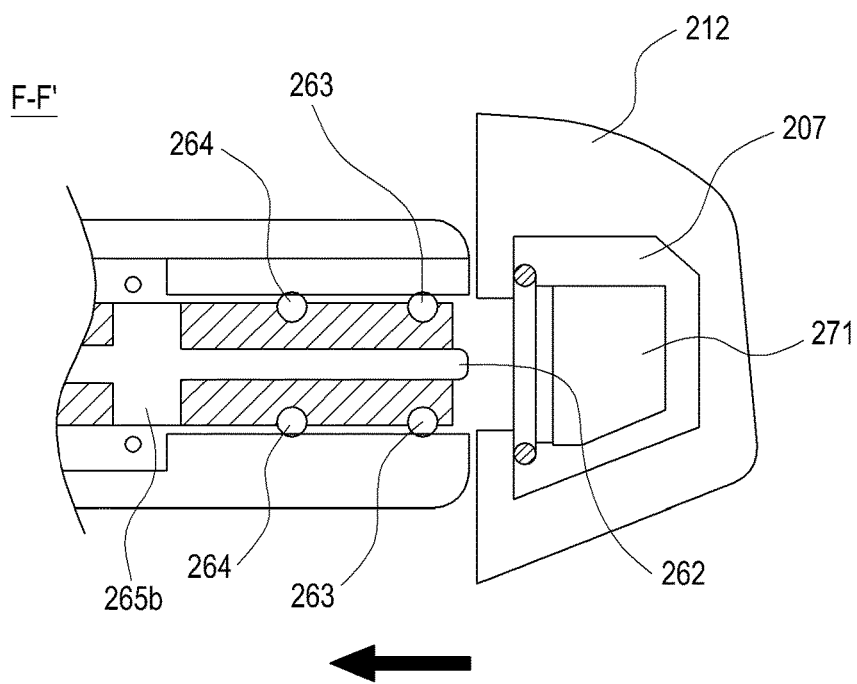
FIG. 24 is a cross-sectional view of a portion of the band structure according to one of various embodiments, which is taken along line F-F' in FIG. 23.

FIG. 23 is a view illustrating a state in which the conductive rod of the band structure according to one of various embodiments is separated from a portion of the housing. FIG. 24 is a cross-sectional view of a portion of the band structure according to one of various embodiments, which is taken along line F-F' in FIG. 23.

Referring to FIGS. 23 and 24, as the conductive rod 262 is moved to the second position where the conductive rod 262 is received into the body portion (e.g., the body portion 261 of FIG. 19), the other end of the conductive rod 262 may be released from the inner channel 212b. For example, as the other end of the conductive rod 262 is released from the inner channel 212b, the housing (e.g., the housing 201 of FIG. 13) and the body portion 261 may be separated from each other. As the other end of the conductive rod 262 is released from the inner channel 212b, the conductive rod 262 may be electrically disconnected from the conductive path 271. As the conductive rod 262 is placed in the second position, the conductive member 265b is not in contact with the connection terminal 266, and thus the insulating member 265a is capable of being in contact with the connection terminal 266. The conductive rod 262 placed in the second position may be electrically disconnected from the connection terminal 266. For example, in the second position where the housing 201 and the body portion 261 are separable from each other, even if the other end of the conductive rod 262 is exposed to the outside and comes into contact with external foreign matter (e.g., water), the electrical connection between the conductive rod 262 and the connection terminal 266 is released. Thus, it is possible to prevent impact from being applied to the electronic component (e.g., the battery) due to the foreign matter (e.g., water).

Figure 25A:
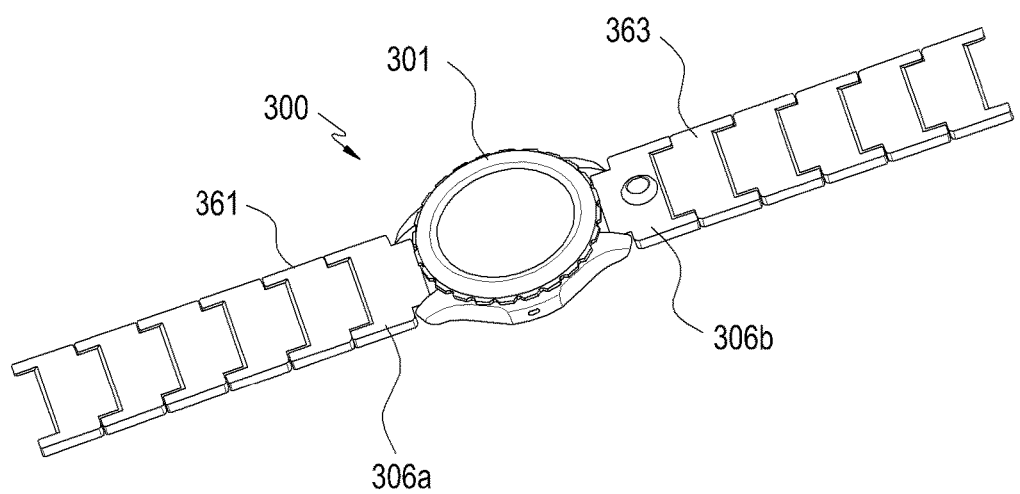
FIG. 25A is a perspective view illustrating a wearable electronic device according to still another one of various embodiments.
Figure 25B:
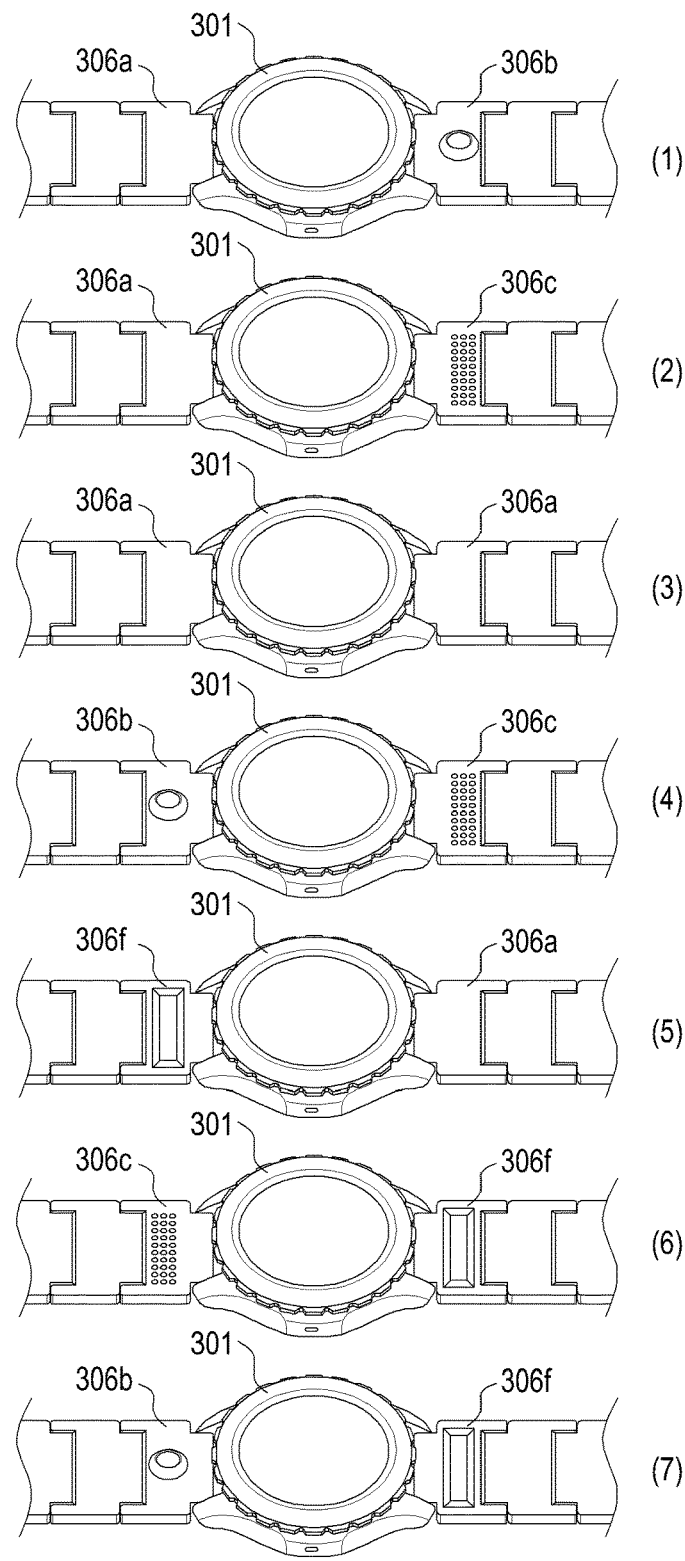
FIG. 25B illustrates perspective views illustrating wearable electronic devices according to another one of various embodiments as an example.

FIG. 25A is a perspective view illustrating a wearable electronic device (e.g., the electronic device 200 of FIG. 2) according to one of various embodiments. FIG. 25B illustrates perspective views illustrating wearable electronic devices according to another one of various embodiments as an example.

Referring to FIGS. 25A and 25B, a wearable electronic device 300, according to various embodiments, may include a housing 301, band structures 306a and 306b, and extensions 361 and 363. The band structures 306a and 306b may be detachably coupled to the housing 301. The band structures 306a and 306b may include a first band structure 306a and a second band structure 306b. For example, as illustrated in FIG. 25B(1), the first band structure 306a may include a battery mounted therein. As another example, the second band structure 306b may include a camera.

According to an example embodiment, the extensions 361 and 363 may be worn on a portion of the user's body. The extensions 361 and 363 may be detachably coupled to the first and second band structures 306a and 306b. The first and second band structures 306a and 306b may be detachably coupled to the housing 301 or the extensions 361 and 363. For example, the user may supplement or add to the functions of the wearable electronic device by replacing the band structure, which is mounted with various electronic components.

According to an example embodiment, as illustrated in FIG. 25B(2), the first band structure 306a may include a battery and the second band structure 306c may include a sound component.

According to an example embodiment, as illustrated in FIG. 25B(3), the first band structure 306a may include a battery and the second band structure 306c may include another battery.

According to an example embodiment, as illustrated in FIG. 25B(4), the first band structure 306b may include a camera and the second band structure 306c may include a sound component.

According to an example embodiment, as illustrated in FIG. 25B(5), the first band structure 306f may include a fingerprint recognition sensor and the second band structure 306a may include a battery. According to an example embodiment, the first band structure 306f is not limited to the fingerprint recognition sensor, and may include various sensors for sensing the user's body information or for sensing temperature.

According to an example embodiment, as illustrated in FIG. 25B(6), the first band structure 306c may include a sound component and the second band structure 306f may include a fingerprint recognition sensor.

According to an example embodiment, as illustrated in FIG. 25B(7), the first band structure 306b may include a camera and the second band structure 306f may include a fingerprint recognition sensor.

Figure 26:
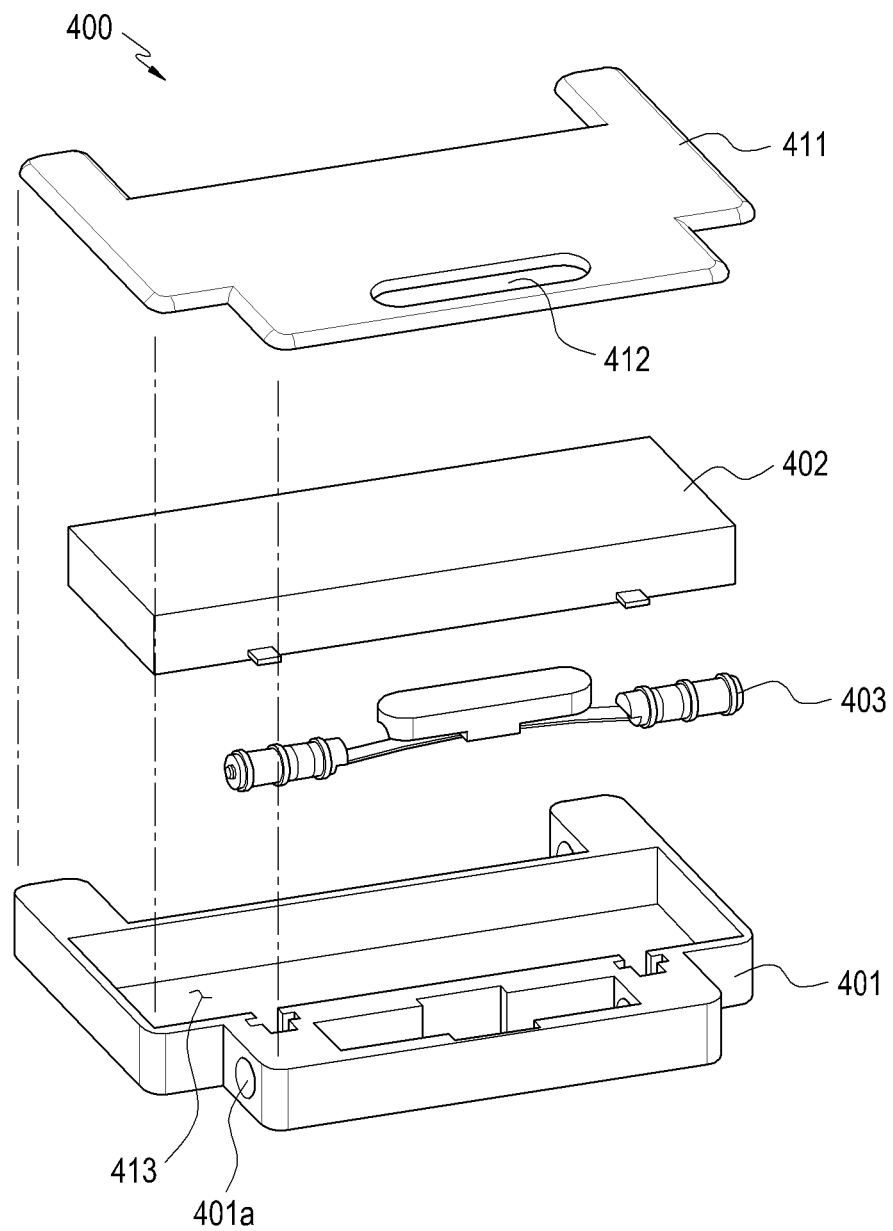
FIG. 26 is a perspective view illustrating a band structure according to still another one of various embodiments.
Figure 27:
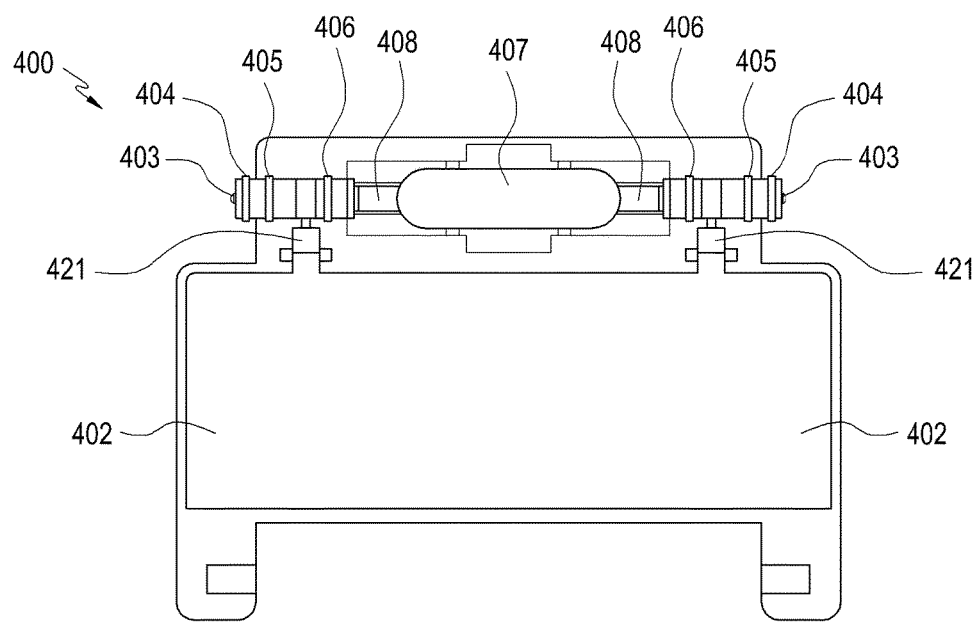
FIG. 27 is a front view illustrating the inside of the band structure according to still another one of various embodiments.
Figure 28:
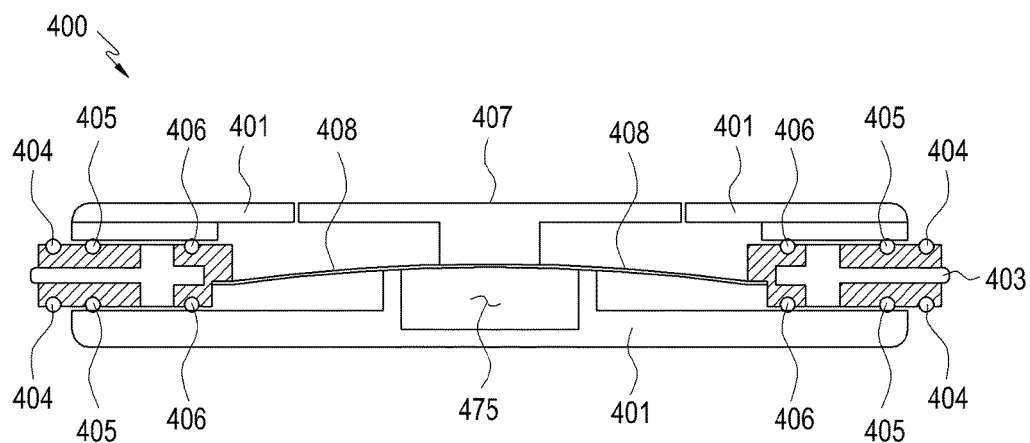
FIG. 28 is a cross-sectional view illustrating the band structure according to still another one of various embodiments.

FIG. 26 is an exploded perspective view illustrating a band structure 400 according to various embodiments. FIG. 27 is a front view illustrating the inside of the band structure according to various embodiments. FIG. 28 is a cross-sectional view illustrating the band structure according to various embodiments.

Referring to FIGS. 26 to 28, the band structure 400, according to still another one of various embodiments, includes a body portion 401, an electronic component 402, a conductive rod 403, a second sealing member 405, a third sealing member 404, a fifth sealing member 406, a button unit 407, a cover 411, and a leaf spring 408.

According to an example embodiment, the body portion 401 may be mounted with the electronic component 402, the conductive rod 403, the second sealing member 405, the third sealing member 404, the fifth sealing member 406, the button unit 407, and the leaf spring 408. A second opening 401a may be formed in a side surface of the body 401. The body portion 401 may be covered by the cover 411. The cover 411 may be provided with, for example, a third opening 412 through which a portion of the button portion 407 is exposed.

According to an example embodiment, the second sealing member 405 is capable of sealing a gap between the conductive rod 403 and the second opening 401a. The third sealing member 404 is capable of sealing a gap between the conductive rod 403 and the external opening (e.g., the external opening 212a of FIG. 7) when the body portion 401 is coupled to the housing (e.g., the housing 201 of FIG. 13).

According to an example embodiment, the button unit 407 may be partially exposed by the third opening 412. The button unit 407 may be moved to the inside of the body portion 401 by an external force or may be moved to the outside of the body portion 401 through the third opening 412. For example, the button unit 407 may be moved in a direction perpendicular to one surface of the cover 411 by a pressing operation of the user.

According to an example embodiment, the leaf spring 408 may be positioned between the button unit 407 and the body portion 401 and may be connected to or may come into contact with the conductive rod 403.

According to an example embodiment, the fifth sealing member 406 may be disposed between the conductive member 408 (e.g., the conductive member 265b of FIG. 23) of the conductive rod 403 and the leaf spring 408, and may enclose the outer circumferential surface of the conductive rod 403. The fifth sealing member 406 is capable of sealing a gap between the conductive rod 403 and the second opening 401a so as to block the entrance of foreign matter into the electronic component 402 through the third opening 412.

Figure 29:
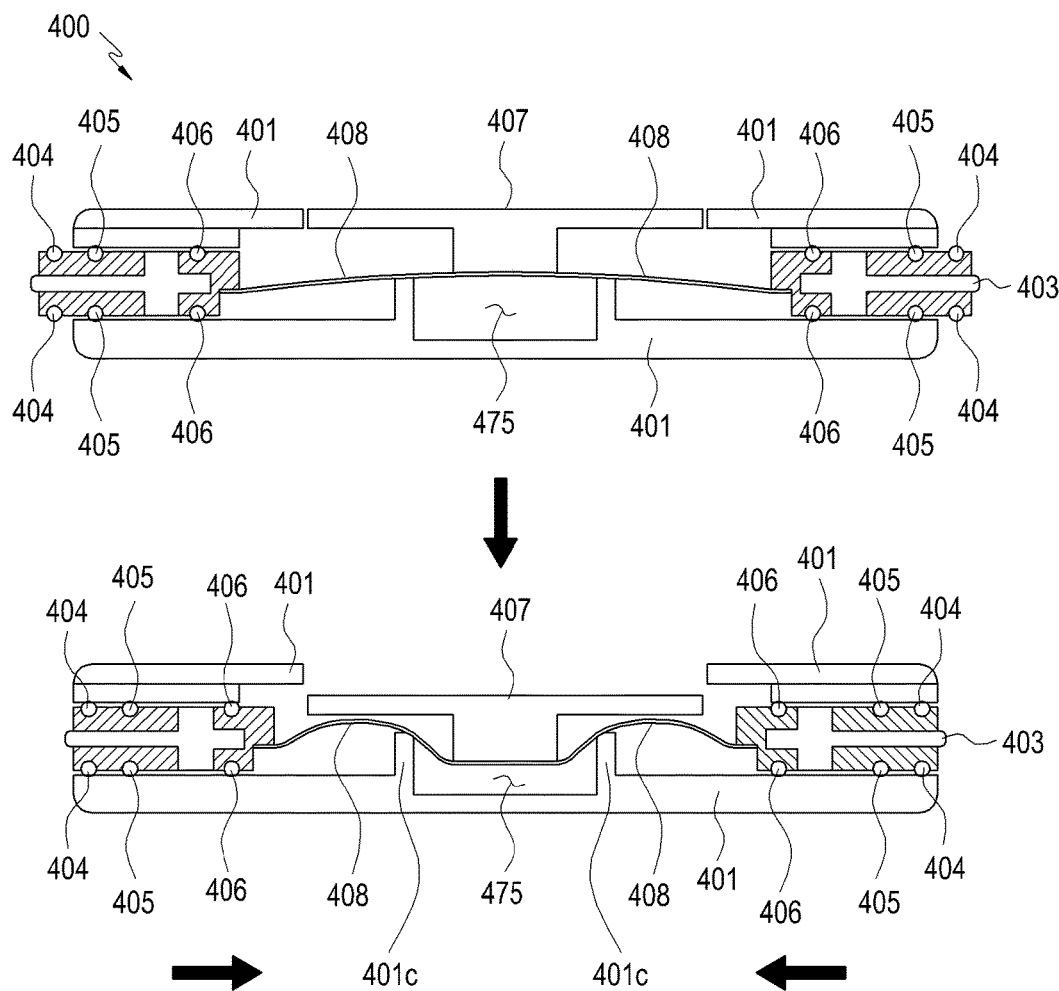
FIG. 29 is a view illustrating an operation in which a button unit of the band structure according to still another one of various embodiments is pressed.
Figure 30:
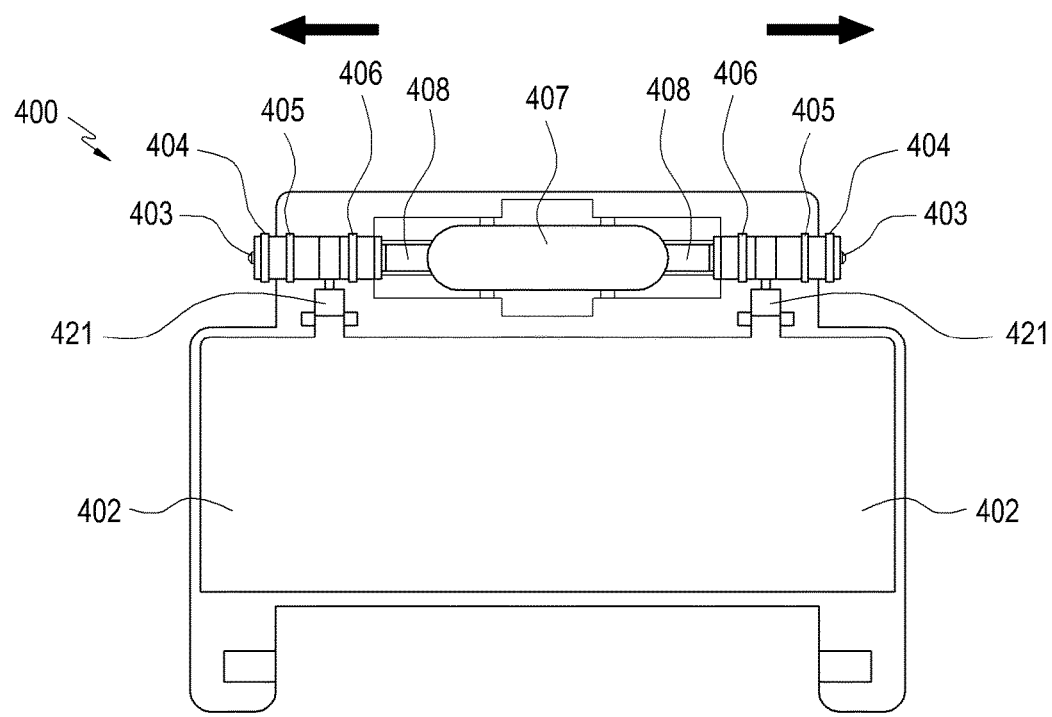
FIG. 30 is a view illustrating a state in which conductive rods of the band structure according to still another one of various embodiments are moved to the outside.
Figure 31:
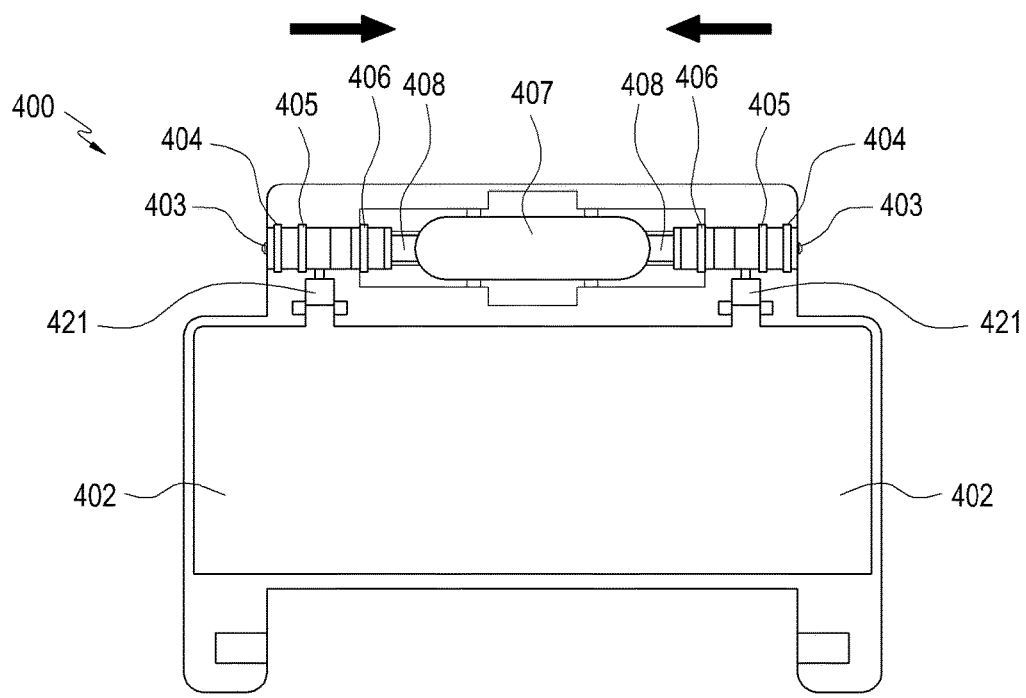
FIG. 31 is a view illustrating a state in which the conductive rods of the band structure according to still another one of various embodiments are moved to the inside.

FIG. 29 is a view illustrating an operation of pressing the button unit 407 of the band structure 400 according to various embodiments. FIG. 30 is a view illustrating a state in which conductive rods of the band structure according to various embodiments are moved to the outside. FIG. 31 is a view illustrating a state in which the conductive rods of the band structure according to various embodiments are moved to the inside.

Referring to FIGS. 29 to 31, the button unit 407 may be moved to the inside of the body portion 401 while pressing the leaf spring 408 by a pressing operation. When the button unit 407 is not pressed, the button unit 407 may be moved toward the outside of the body portion 401 by being provided with the elastic force from the leaf spring 408.

According to an example embodiment, as illustrated in FIGS. 29 and 30, the button unit 407 may be placed in a first position where one surface of the button unit 407 is disposed substantially parallel to one surface of the body portion 401 by being provided with the elastic force from the leaf spring 408. The leaf spring 408 has an elastic force in a direction parallel to the conductive rod 403, and thus the conductive rod 403 may protrude to the outside of the body portion 401. As the conductive rod 403 protrudes to the outside of the body portion 401, the conductive rod 403 may the band structure 400 and the housing 201 (e.g., the housing 201 of FIG. 13) to each other.

According to an example embodiment, as illustrated in FIGS. 29 and 31, when the button unit 407 presses the leaf spring 408 by a pressing operation, the button portion 407 may be placed in the second position. According to an example embodiment, a first space 475 may be formed by protrusions 401c. When the button portion 407 is placed in the second position, at least a portion of the leaf spring 408 may be caught by the protrusions 401c while being moved to the first space 475, thereby having a bent shape. As the leaf spring 408 has a bent shape, the leaf spring 408 may cause the conductive rod 403 to be moved to the inside of the body portion 401 while compressed. As the conductive rod 403 moves into the body portion 401, the conductive rod 403 may separate the band structure 400 and the housing (e.g., the housing 201 of FIG. 13) from each other.

Figure 32:
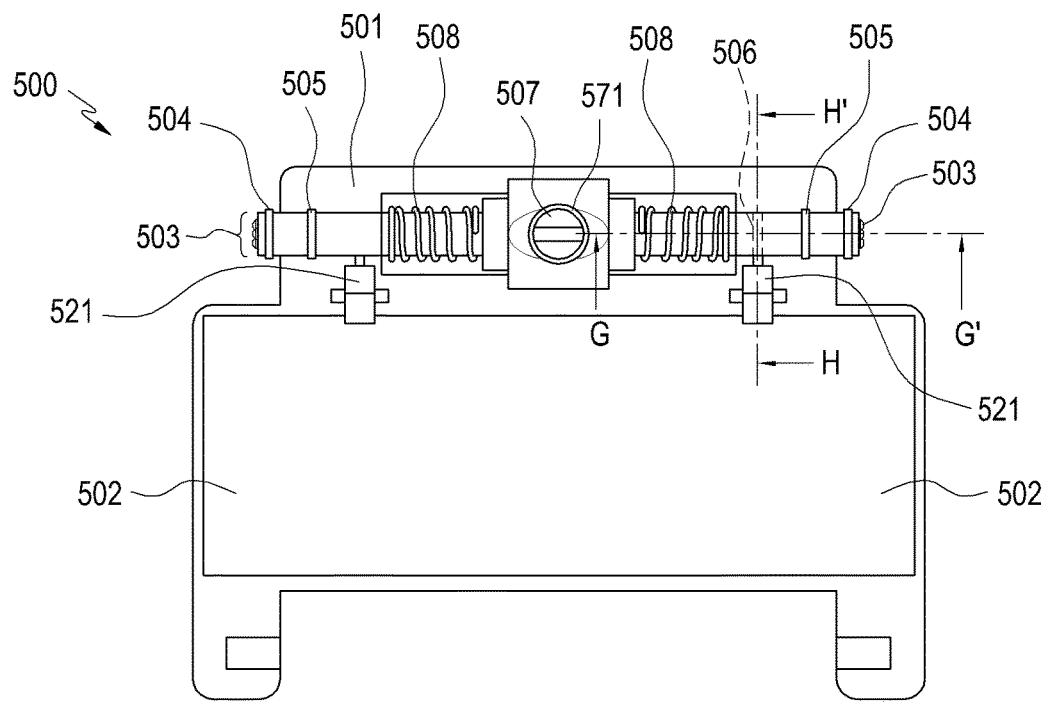
FIG. 32 is a front view illustrating the inside of the band structure according to still another one of various embodiments.
Figure 33:
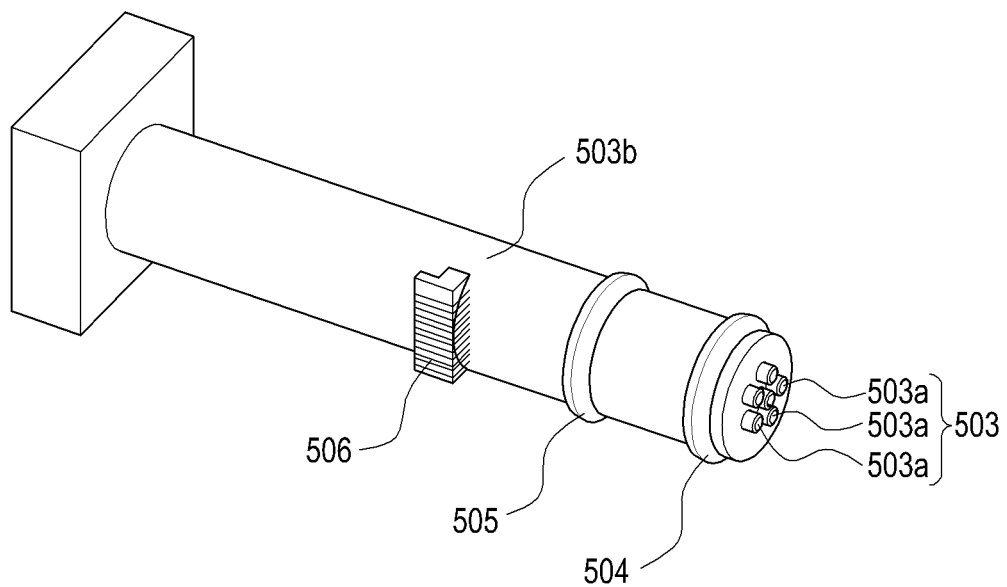
FIG. 33 is a perspective view illustrating a conductive rod and a first multi-connection terminal of the band structure according to still another one of various embodiments.
Figure 34:
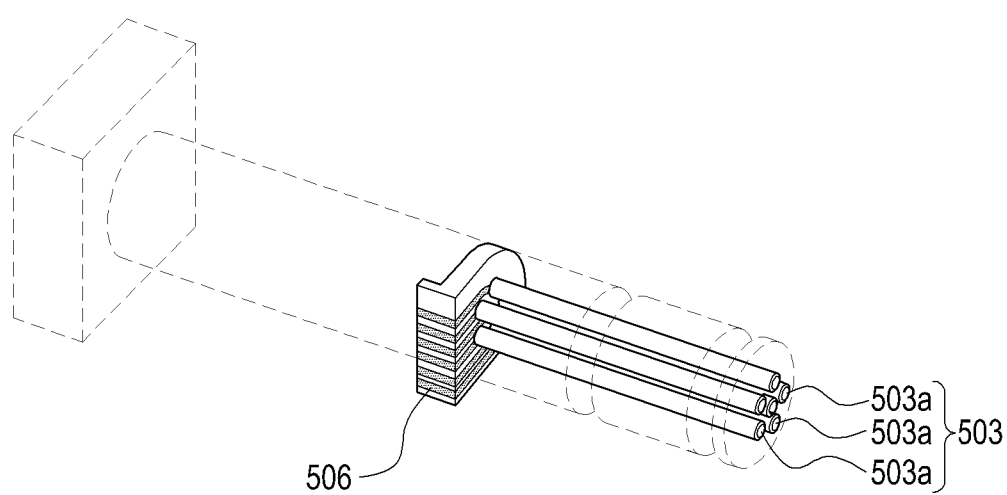
FIG. 34 is a perspective view illustrating a state in which the conductive rod and the first multi-connection terminal of the band structure according to still another one of various embodiments are connected to each other.
Figure 35:
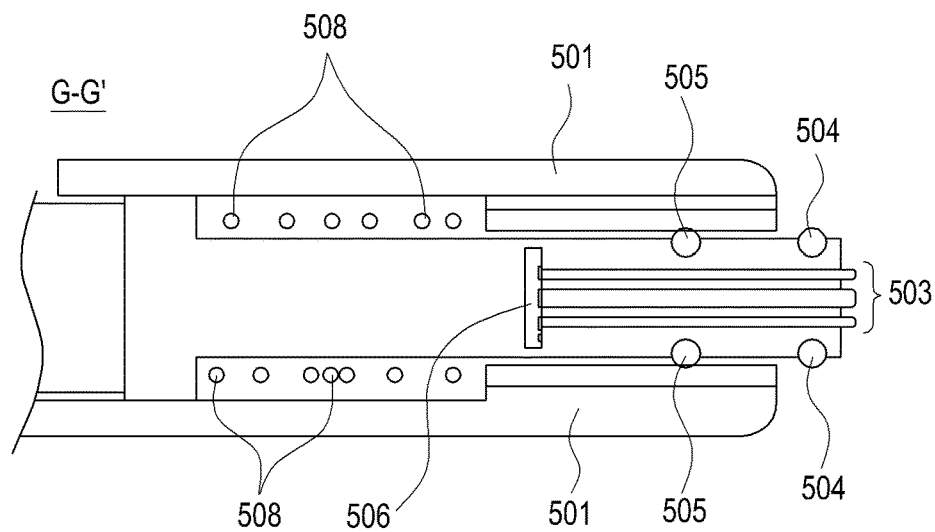
FIG. 35 is a perspective view illustrating the first multi-connection terminal of the band structure according to still another one of various embodiments.

FIG. 32 is a front view illustrating the inside of a band structure 500 according to various embodiments. FIG. 33 is a perspective view showing a conductive band and a first multi-connection terminal 506 of a band structure according to various embodiments. FIG. 34 is a perspective view illustrating a state in which the conductive rod and the first multi-connection terminal of the band structure according to various embodiments are connected to each other. FIG. 35 is a cross-sectional view of a portion of the band structure according to various embodiments, which is taken along line G-G' in FIG. 32.

Referring to FIGS. 32 to 35, the band structure 500, according to various embodiments, may include a body portion 501 (e.g., the body portion 261 of FIG. 14), an electronic component 502 (e.g., the electronic component 267 of FIG. 15), a conductive rod 503 (e.g., the conductive rod 262 of FIG. 15), a second sealing member 504 (e.g., the second sealing member 263 of FIG. 15), a third sealing member 505 (e.g., the third sealing member 264 of FIG. 15), a fourth sealing member 571 (e.g., the fourth sealing member 269 of FIG. 18), an elastic member 508 (e.g., the elastic member 268 of FIG. 15), a cam structure 507 (e.g., the cam structure 268a of FIG. 15), a first multi-connection terminal 506, and a second multi-connection terminal 521.

According to an example embodiment, the conductive rod 503 may include a plurality of conductive lines 503a, an insulating member 503b, and a first multi-connection terminal 506. The insulating member 503b may partially enclose the plurality of conductive lines 503a.

According to an example embodiment, the first multi-connection terminal 506 may be exposed to at least a portion of the side surface of the conductive rod 503 while being connected to the plurality of conductive lines 503a.

Figure 36:
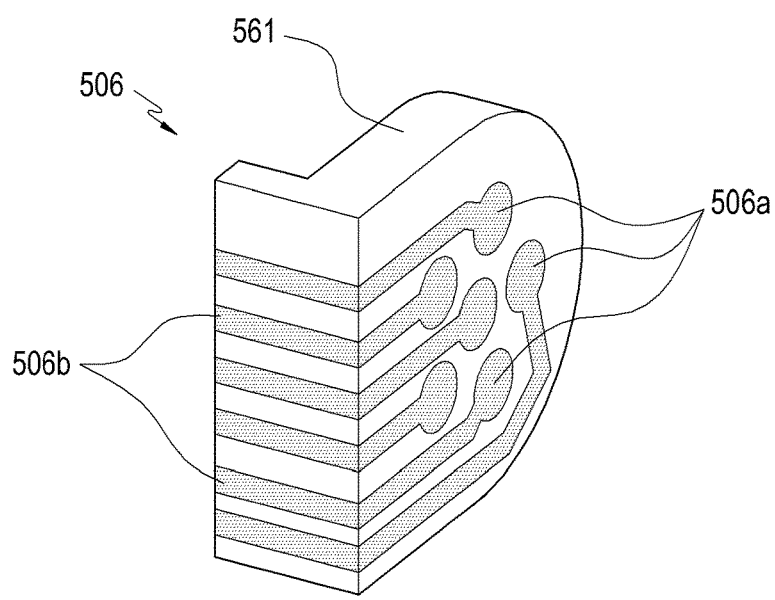
FIG. 36 is a cross-sectional view of a portion of the band structure according to still another one of various embodiments, which is taken along line D-D' in FIG. 32.
Figure 37:
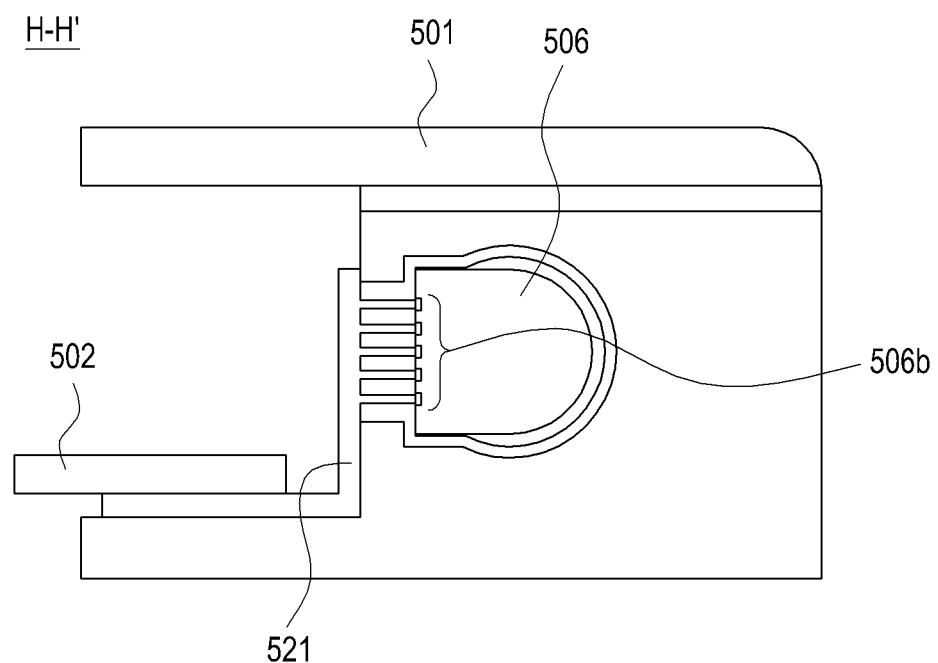
FIG. 37 is a cross-sectional view of a portion of the band structure according to still another one of various embodiments, which is taken along line H-H' in FIG. 32.
Figure 38:
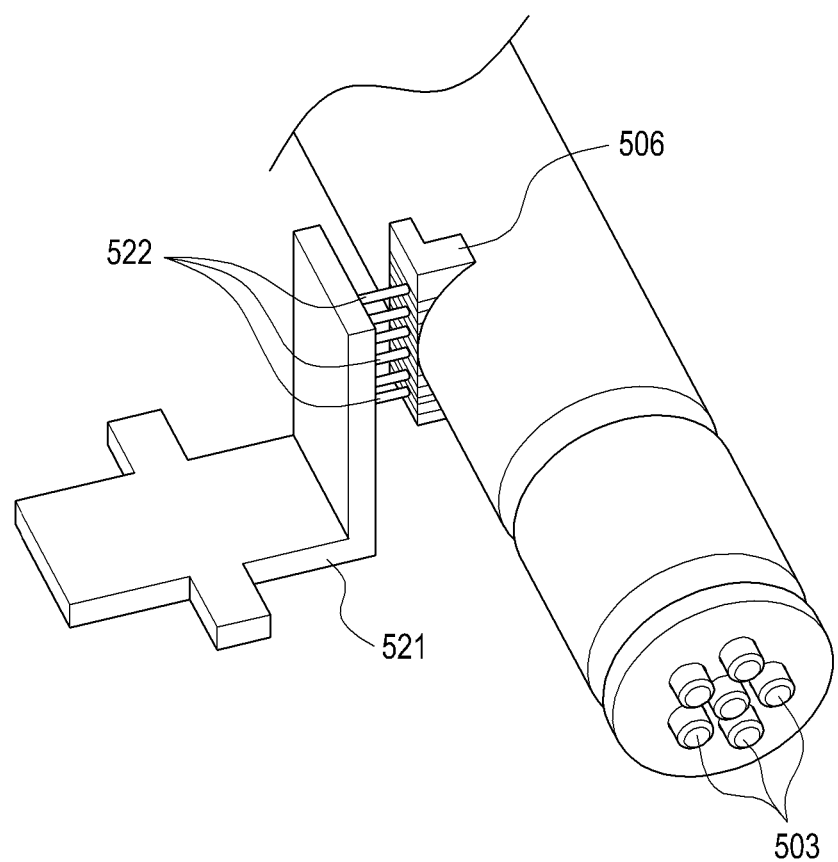
FIG. 38 is a perspective view illustrating a state in which a first multi-connection terminal and a second multi-connection terminal of the band structure according to still another one of various embodiments are connected.

FIG. 36 is a perspective view illustrating the first multi-connection terminal of the band structure according to various embodiments. FIG. 37 is a cross-sectional view of a portion of the band structure according to various embodiments, which is taken along line H-H' in FIG. 32. FIG. 38 is a perspective view illustrating a state in which the first multi-connection terminal and the second multi-connection terminal of the band structure according to various embodiments are connected.

Referring to FIGS. 36 to 38, the first multi-connection terminal 506 may include a substrate 561, a plurality of first connection portions 506a, and a plurality of second connection portions 506b. The plurality of first connection portions 506a may be disposed on one surface of the substrate 561. Each of the plurality of first connection portions 506a may be connected to one end of one of the plurality of conductive lines (e.g., the plurality of conductive lines 503a of FIG. 34). The plurality of second connection portions 506b may extend from the plurality of first connection portions 506a to another surface of the substrate 561. The plurality of second connection portions 506b may be in contact with the second multi-connection terminal 521.

According to an example embodiment, the second multi-connection terminal 521 may include a plurality of third connection portions 522. The plurality of third connection portions 522 may be in contact with the plurality of second connection portions 506b. The second multi-connection terminal 521 may be electrically connected to the electronic component 502. The second multi-connection terminal 521 may electrically connect the electronic component 502 and the conductive rod 503 to each other. The first and second multi-connection terminals 506 and 521 may provide a path for transmitting or receiving a plurality of electrical signals to or from the electronic component 502.

Figure 39:
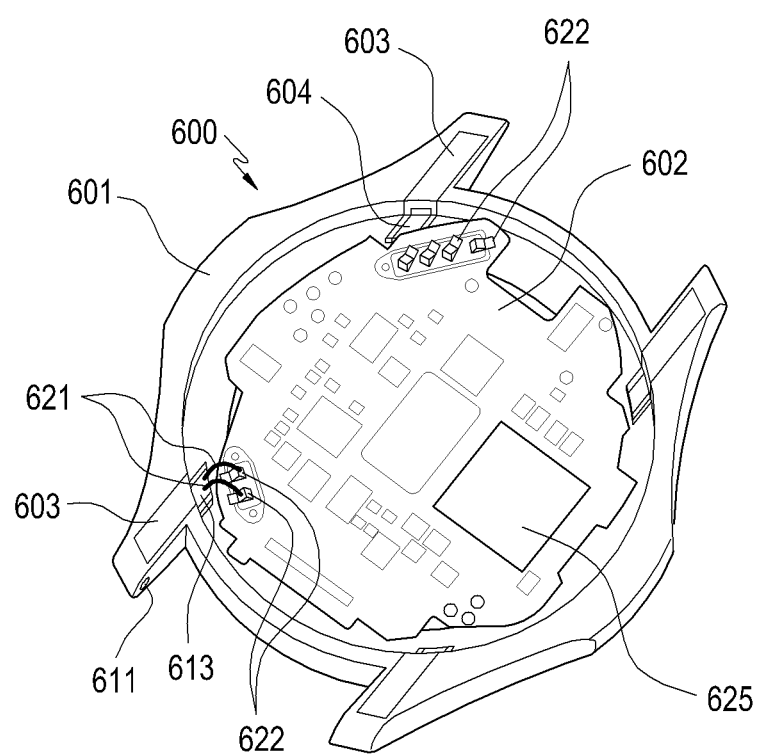
FIG. 39 is a perspective view illustrating a state in which a PCB and a conductive path of the wearable electronic device according to still another one of various embodiments are electrically connected.

FIG. 39 is a perspective view illustrating a state where a PCB 602 and a conductive path 604 of a wearable electronic device 600 according to various embodiments are electrically connected to each other.

Referring to FIG. 39, the wearable electronic device 600, according to various embodiments, may include a housing 601, the PCB 602, an insulating structure 603, and a conductive path 604. The housing 601 may include a portion connected to the band structure (e.g., the band structure 206 of FIG. 2). The portion may include the insulating structure 603 and the conductive path 604. The conductive path 604 may include a first end 613 and a second end 611. The second end 611 may be electrically connected to a conductive rod (e.g., the conductive rod 262 of FIG. 15). According to an example embodiment, the PCB 602 is disposed inside the housing 601, and the connector 622 is mounted on the PCB 602.

According to an example embodiment, the first end 613 of the conductive path 604 is exposed to the inside of the housing 601 and may be connected to the connector 622 through a conductive line 621. The electronic component 267 mounted on the band structure 262 may be electrically connected to the PCB 602 via the connection terminal 266, the conductive rod 262, the conductive path 604, the lead 621, and the connector 622. According to an example embodiment, the conductor 621 may be formed in a C-clip shape. According to an example embodiment, the conductive line 621 is not limited to the C-clip shape, and may have various shapes for connecting the first end 613 and the PCB 602.

According to an example embodiment, when the electronic component (e.g., the electronic component 502 of FIG. 37) transmits or receives a plurality of electrical signals, the conductive path 604 may be formed of a plurality of lines. The plurality of lines may be connected to the plurality of connectors 622 through the plurality of conductive lines 621. For example, the electronic component (e.g., the electronic component 502 of FIG. 37) may be electrically connected to the PCB 602 via the second multi-connection terminal (e.g., the second multi-connection terminal 521 of FIG. 37), the first multi-connection terminal (e.g., the first multi-connection terminal 506 of FIG. 37), the conductive rod 503, the plurality of lines of a conductive path 604, the plurality of conductive lines 621, and the plurality of connectors 622.

A wearable electronic device, according to various embodiments, may include: a housing including a front plate, a rear plate, and a side member surrounding an inner space between the front plate and the rear plate, wherein the side member includes at least one portion including an external opening and an inner channel connecting between the inner space and the external opening: an insulating structure inserted into the inner channel; a conductive path partially embedded in the insulating structure, wherein the conductive path includes a first end exposed to the inner space and a second end exposed to the external opening; at least one printed circuit board located in the inner space and electrically connected to the first end of the conductive path; a display exposed through the front plate; and a band structure connected to the portion of the housing and configured to be mounted on a portion of a human body, wherein the band structure includes a conductive rod movably inserted into the external opening and electrically connected to the second end of the conductive path, and an electronic component at least partially embedded in the band structure and electrically connected to the conductive rod.

According to an example embodiment, the wearable electronic device may further include a sealing member interposed between the insulating structure and one surface of the inner channel around the external opening.

According to an example embodiment, the sealing member may include an O-ring.

According to an example embodiment, the sealing member may include a sealant placed on the one surface of the inner channel.

According to an example embodiment, the conductive rod extends along an axis, and is configured to be movable between a first position and a second position, and wherein the conductive rod is configured to be electrically connected to the electronic component at the first position and is disconnected from the electronic component at the second position.

According to an example embodiment, the band structure may include an elastic member configured to press the conductive rod toward the external opening.

According to an example embodiment, the band structure may further include a cam structure configured to be in contact with one end of the conductive rod.

According to an example embodiment, the band structure may include a through hole and a membrane covering the through hole, and the membrane may be configured to allow air to pass through the through hole and to prevent fluid from passing through the through hole.

According to an example embodiment, the electronic component may include at least one of a sound component, a camera, a sensor, and a battery.

According to various embodiments, a wearable electronic device may include: a housing including a front plate, a rear plate, and a side member surrounding an inner space between the front plate and the rear plate, wherein the side member includes at least one portion including an external opening and an inner channel connecting the inner space and the external opening: an insulating structure inserted into the inner channel; a conductive path partially embedded in the insulating structure and including a conductive path having a first end exposed to the inner space and a second end exposed to the external opening; a display exposed through the front plate; and a band structure connected to the portion of the housing and having a shape mounted on a portion of a human body, wherein the band structure may include a conductive rod inserted to be movable inwardly of the external opening and electrically connected to the second end of the conductive path, and an electronic component at least partially embedded in the band structure and electrically connected to the conductive rod.

According to an example embodiment, the wearable electronic device may further include a sealing member located between the insulating structure and one surface of the inner channel around the external opening.

According to an example embodiment, the sealing member may include an O-ring.

According to an example embodiment, the sealing member may include a sealant placed on a surface of the inner channel.

According to an example embodiment, the conductive rod extends along an axis and may be configured to be movable between a first position and a second position along the axis, and wherein the conductive rod is configured to be electrically connected to the electronic component in the first position and to be disconnected from the electronic component in the second position.

According to an example embodiment, the band structure may include an elastic member configured to press the conductive rod toward the external opening.

According to an example embodiment, the band structure may further include a cam structure configured to be in contact with one end of the conductive rod.

According to an example embodiment, the band structure may include a through hole and a membrane covering the through hole, and the membrane may be configured to allow air to pass therethrough and to prevent liquid from passing therethrough.

According to an example embodiment, the electronic component may include at least one of a speaker, a camera, a battery, a storage medium, and a sensor.

According to an example embodiment, the wearable electronic device may further include a band structure having a second opening formed therein and mounted on a portion of a human body; a conductive rod configured to be movable through the second opening and to detachably couple the housing and the band structure; and a second sealing member configured to seal a gap between the second opening and the conductive rod.

According to an example embodiment, the wearable electronic device may further include a third sealing member disposed adjacent to an end of the conductive rod and configured to seal a gap between the external opening and the conductive rod when the housing and the band structure are coupled.

According to an example embodiment, the sealing member may be configured to seal a gap between the outer surface of the insulating structure and one surface of the inner channel.

According to an example embodiment, the wearable electronic device may further include an adhesive layer between the outer surface of the insulating structure and one surface of the inner channel.

According to an example embodiment, the wearable electronic device may further include a printed circuit board positioned in the inner space. The conductive path may be partially embedded in the insulating structure and may be electrically connected to the printed circuit board.

According to an example embodiment, the band structure may include a body portion in which the second opening is disposed, and an electronic component mounted inside the body portion.

According to an example embodiment, the conductive rod may electrically connect the electronic component and the conductive path.

According to an example embodiment, the first end of the conductive path may be exposed from the insulating structure and may be electrically connected to the printed circuit board, and the second end of the conductive path may be exposed from the insulating structure and may be electrically connected to the conductive rod.

According to an example embodiment, the band structure may include: an elastic member configured to apply an elastic force to the conductive rod in a direction toward the second opening; and a cam structure partially exposed through a third opening disposed in the body portion and configured to move the conductive rod while rotating.

According to an example embodiment, the cam structure has a first outer diameter and a second outer diameter smaller than the first outer diameter, and, while rotating, the conductive rod may selectively come into contact with one of the outer surface of the first outer diameter and the outer surface of the second outer diameter such that the cam structure is capable of moving the conductive rod.

According to an example embodiment, the conductive rod may be connected to, or may be disconnected from, the conductive path as the conductive rod moves in the body portion.

According to an example embodiment, the band structure may include a fourth sealing member configured to seal a gap between the cam structure and the third opening.

According to an example embodiment, the band structure may include at least one connection terminal configured to interconnect the conductive rod and the at least one electronic component.

According to an example embodiment, the conductive rod includes an insulating member configured to partially enclose an outer circumferential surface of the conductive rod, and a conductive member partially exposed on the outer circumferential surface of the conductive rod; and the connection terminal may be brought into contact with the conductive member or may be released from the contact with the conductive member as the conductive rod moves.

According to an example embodiment, a through hole is disposed in a side surface of the body portion, the band structure includes a membrane covering the through hole, and the membrane may be configured to allow air to be discharged through the through hole and to block the entrance of fluid into the body portion.

According to an example embodiment, the band structure may include a leaf spring connected to the conductive rod, and a button unit partially exposed through a fourth opening disposed in the body portion and configured to move the conductive rod in the body portion as the leaf spring is pressed.

According to an example embodiment, the conductive path may include at least one conductive line.

According to various embodiments, a band structure, included in a wearable electronic device, may include: a body portion in which a second opening is disposed; a conductive rod configured to be movable through the second opening and to couple the wearable electronic device and the body portion; and a second sealing member configured to seal a gap between the second opening and the conductive rod.

According to an example embodiment, the band structure may further include an electronic component mounted inside the body portion and electrically connected to the wearable electronic device through the conductive rod.

According to various embodiments, a wearable electronic device may include: a housing with an external opening formed therein; an insulating structure inserted into the external opening; a first sealing member configured to seal a gap between the external opening and the insulating structure; a band structure with a second opening formed therein and mounted on a portion of a human body; a conductive rod configured to be movable through the second opening and to detachably couple the housing and the band structure; a second sealing member configured to seal a gap between the second opening and the conductive rod; and a third sealing member disposed adjacent to an end of the conductive rod and configured to seal a gap between the external opening and the conductive rod when the housing and the band structure are coupled.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. A wearable electronic device comprising:
   a housing including a front plate, a rear plate, and a side member surrounding an inner space between the front plate and the rear plate, wherein the side member includes at least one portion including an external opening and an inner channel connecting between the inner space and the external opening;
   an insulating structure provided in the inner channel;
   a conductive path partially embedded in the insulating structure, wherein the conductive path includes a first end exposed to the inner space and a second end exposed to the external opening;
   a display viewable through the front plate; and
   a band structure connected to the portion of the housing and having a shape configured to be mounted on a portion of a human body,
   wherein the band structure includes a conductive rod inserted to be movable inwardly of the external opening and electrically connected to the second end of the conductive path, and an electronic component at least partially embedded in the band structure and electrically connected to the conductive rod.

2. The wearable electronic device of claim 1, further comprising:
   a sealing member interposed between the insulating structure and one surface of the inner channel around the external opening.

3. The wearable electronic device of claim 2, wherein the sealing member includes an O-ring.

4. The wearable electronic device of claim 2, wherein the sealing member includes a sealant placed on the one surface of the inner channel.

5. The wearable electronic device of claim 1, wherein the wearable electronic device further comprises an adhesive layer between the outer surface of the insulating structure and the one surface of the inner channel.

6. The wearable electronic device of claim 1, further comprising:
   a printed circuit board positioned in the inner space,
   wherein the conductive path is partially embedded in the insulating structure and is electrically connected to the printed circuit board.

\* \* \* \* \*